(12) United States Patent
Hu et al.

(10) Patent No.: US 11,682,955 B2
(45) Date of Patent: Jun. 20, 2023

(54) OPTICAL ELEMENT DRIVING MECHANISM

(71) Applicant: TDK TAIWAN CORP., Taoyuan (TW)

(72) Inventors: Chao-Chang Hu, Taoyuan (TW); Liang-Ting Ho, Taoyuan (TW); Che-Wei Chang, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 336 days.

(21) Appl. No.: 17/006,240

(22) Filed: Aug. 28, 2020

(65) Prior Publication Data

US 2021/0143720 A1 May 13, 2021

Related U.S. Application Data

(60) Provisional application No. 62/932,625, filed on Nov. 8, 2019.

(51) Int. Cl.
| | |
|---|---|
| *H02K 41/02* | (2006.01) |
| *B06B 1/02* | (2006.01) |
| *H02N 2/02* | (2006.01) |
| *H02K 33/02* | (2006.01) |
| *H02K 33/12* | (2006.01) |
| *B06B 1/04* | (2006.01) |

(52) U.S. Cl.
CPC ............. *H02K 41/02* (2013.01); *B06B 1/02* (2013.01); *H02K 33/02* (2013.01); *H02K 33/12* (2013.01); *H02N 2/02* (2013.01); *B06B 1/045* (2013.01)

(58) Field of Classification Search
CPC ...... H02K 41/02; H02K 41/031; H02K 33/02; H02K 33/12; H02N 2/02; B06B 1/02; B06B 1/045
See application file for complete search history.

(56) References Cited

U.S. PATENT DOCUMENTS

2019/0151896 A1* 5/2019 Takahashi .............. B06B 1/045
2021/0143718 A1* 5/2021 Hu ........................ H02K 33/02

* cited by examiner

*Primary Examiner* — Emily P Pham
(74) *Attorney, Agent, or Firm* — Muncy, Geissler, Olds & Lowe, P.C.

(57) ABSTRACT

A vibration module is provided, having a main axis passing through the center of the vibration module, including a fixed part and a first vibration part. The first vibration part is disposed within the fixed part. The first vibration part includes a first moving member and a first driving assembly. The first driving assembly drives the first moving member to move relative to the fixed part.

19 Claims, 23 Drawing Sheets

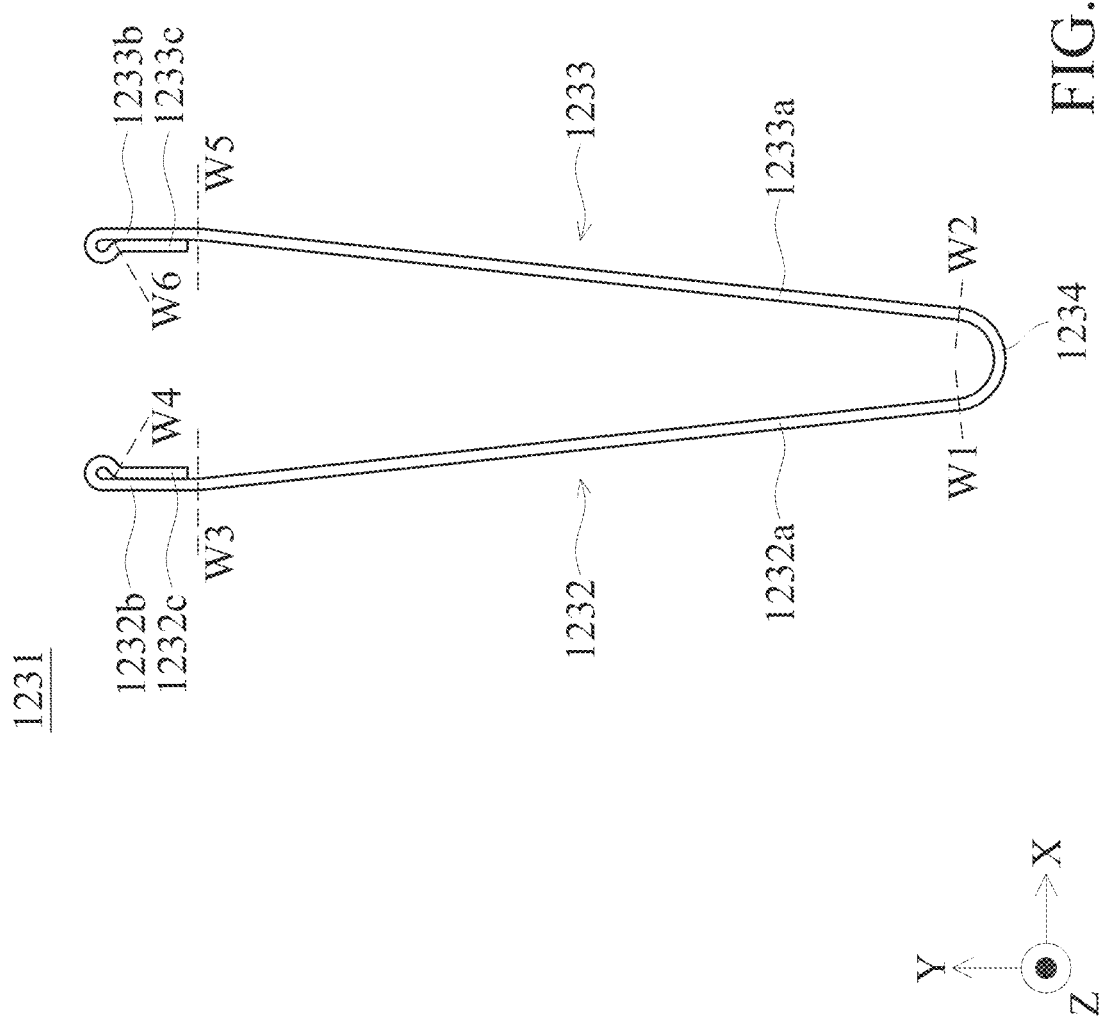

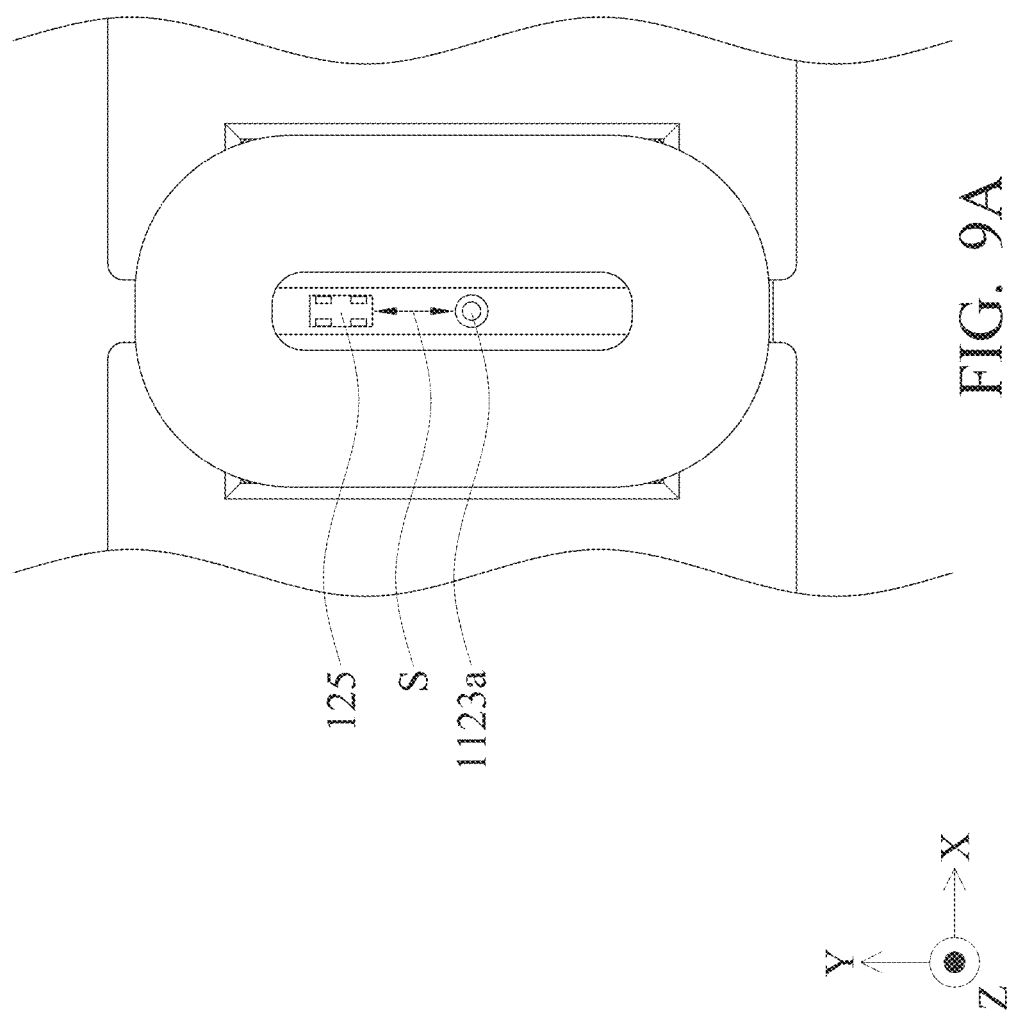

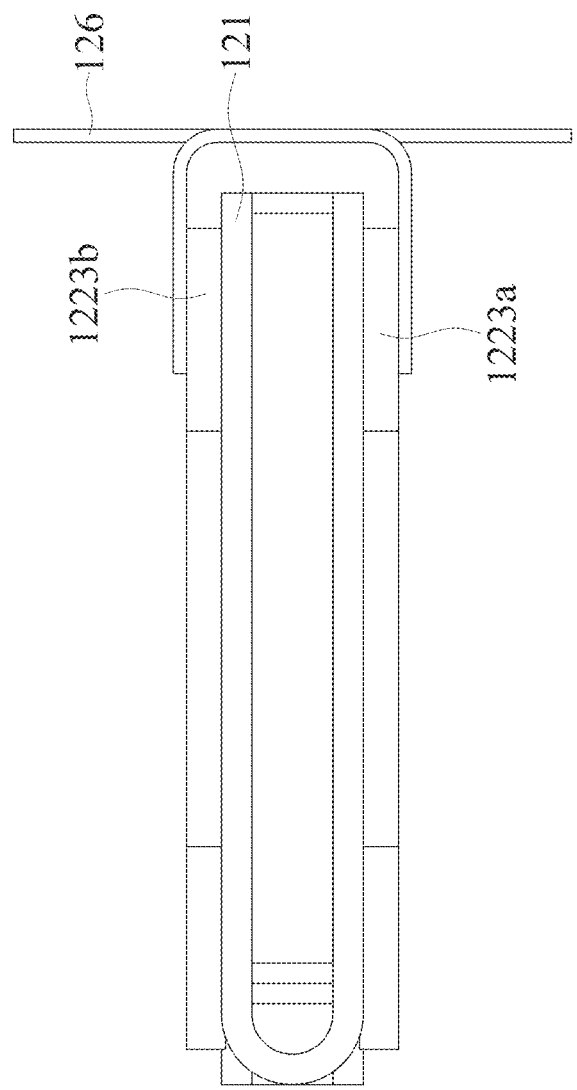
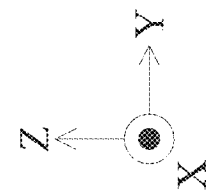
FIG. 10A

OPTICAL ELEMENT DRIVING MECHANISM

CROSS-REFERENCE TO RELATED APPLICATIONS

The present application claims priority to U.S. Provisional Patent Application No. 62/932,625, filed on Nov. 8 2019.

BACKGROUND OF THE DISCLOSURE

Field of the Disclosure

The present invention relates to a vibration module, in particular to a linear vibration module.

Description of the Related Art

With the development of technology, many electronic devices (such as tablets or smartphones) nowadays have vibrating alarms and notifications. These electronic devices may vibrate to alert the user via a vibration module disposed on the electronic devices when performing a specific function. For example, the electronic devices may vibrate to remind the users when the electronic device receives messages or when the users press the buttons of the electronic device.

In the current vibration modules, a rotating motor rotates an eccentric element to generate vibration. However, the aforementioned rotating motor is a conventional direct current (DC) brushed motor, so that the thickness of the vibration module cannot be reduced any further. Furthermore, since the aforementioned eccentric element is disposed outside the rotating motor and is connected to the rotating axis of the rotating motor, and as a result the length of the vibration module cannot be reduced any further, and therefore the vibration module likewise cannot be reduced in size any further. In addition, the vibration module composed of the rotating motor and the eccentric element may generate vibrations in a single direction or a single plane only.

Therefore, how to design a vibration module to provide at least two vibration directions and which may achieve miniaturization of the vibration module is now an important subject worth discussing and solving.

BRIEF SUMMARY OF THE DISCLOSURE

To solve the problems of the prior art, a vibration module is provided, having a main axis passing through a center of the vibration module, including a fixed part and a first vibration part. The first vibration part is disposed within the fixed part, including a first moving member and a first driving assembly. The first driving assembly drives the first moving member to move relative to the fixed part.

In one of the embodiments of the present disclosure, the fixed part includes an outer frame centered on the main axis and surrounds the first moving member, and the outer frame has a gap, the gap traverses the outer frame along the main axis. The fixed part includes a bottom plate and a cover element. The bottom plate has a through hole. The main axis passes through the bottom plate. The cover element covers the through hole. The fixed part includes an outer frame and a bottom plate. The outer frame is centered on the main axis and surrounds the first moving member. The bottom plate has a through hole. The main axis passes through the bottom plate. A gap is provided between the outer frame and the bottom plate when viewed along the main axis or along a direction perpendicular to the main axis.

In one of the embodiments of the present disclosure, the first vibration part further includes a position sensing assembly to sense the movement of the first moving member relative to the fixed part, the first driving assembly includes a first coil and a first magnetic element, a non-zero distance is provided between a center of the position sensing assembly and a winding axis of the first coil. The first vibration part further includes a first circuit assembly and a supporting element. The first circuit assembly is electrically connected to the first driving assembly. The supporting element is disposed between the first driving assembly and the fixed part. The first circuit assembly at least partially overlaps the supporting element when viewed in a direction perpendicular to the main axis. The first circuit assembly at least partially overlaps the first moving member when viewed along the main axis. The first circuit element does not overlap the first moving member when viewed along a first direction not parallel to the main axis. The first circuit assembly at least partially overlaps the first moving member when viewed along a second direction not parallel to the first direction and the main axis.

In one of the embodiments of the present disclosure, the first moving member has a plate-like structure. The first moving member includes a first moving member body and a first moving member connecting portion. The first moving member connecting portion protrudes from the first moving member body. The first vibration part further includes a first elastic element. the first elastic element includes a first bent section. The first bent section is fixedly connected to the first moving member connecting portion. A surface of the first bent section is flush with a surface of the first moving member connecting portion, and the surface of the first bent section is not parallel to the main axis. The first elastic element includes a plurality of springs. The springs are respectively located at opposite sides of the first moving member, and the springs are respectively disposed in the opposite directions. Each of the springs respectively includes a recessed structure, and openings of the recessed structures face different directions.

In one of the embodiments of the present disclosure, each of the springs includes a first segment, a second segment and a bent portion. The first segment is connected to the second segment through the bent portion. The first segment includes a first straight section, a first bent section and a first folded section extending at different angles. The first bent section at least partially overlaps the first folded section when viewed along a direction perpendicular to the main axis. The second segment includes a second straight section, a second bent section and a second folded section extending at different angles. The first bent section at least partially overlaps the second bent section when viewed along the direction perpendicular to the main axis.

In one of the embodiments of the present disclosure, the first driving assembly includes a magnetic conductive element, a first magnetic element and a first coil corresponding to the first magnetic element. The magnetic conductive element is disposed between the first magnetic element and the first coil. The first driving assembly drives the first moving member to move in a first direction, and the first direction is not parallel to the main axis. The first driving assembly further includes two first coils respectively disposed on both sides of the first magnetic element. The first coils at least partially overlap each other when viewed along the main axis, and shortest distances between the first magnetic element and each of the first coils are different.

In one of the embodiments of the present disclosure, a surface of the first magnetic element facing the first coil is provided with the magnetic conductive element. A shortest distance between the magnetic element and the other first coil is substantially the same as a shortest distance between the magnetic conductive element and one of the first coils. The first vibration part further includes a glue recess provided adjacent to the first magnetic element. A surface of the first magnetic element facing the other first coil protrudes from the glue recess.

BRIEF DESCRIPTION OF THE DRAWINGS

The invention can be more fully understood by reading the subsequent detailed description and examples with references made to the accompanying drawings, wherein:

FIG. 7 shows a schematic view of a spring according to an embodiment of the invention.

FIG. 9A shows a schematic view of a first coil and a position sensing assembly according to an embodiment of the invention.

FIG. 10A shows a schematic view of the first moving member and the first circuit assembly viewed along a first direction according to an embodiment of the invention.

DETAILED DESCRIPTION OF THE DISCLOSURE

The making and using of vibration module of embodiments of the present disclosure are discussed in detail below. It should be appreciated, however, that the embodiments provide many applicable inventive concepts that can be embodied in a wide variety of specific contexts. The specific embodiments discussed are merely illustrative of specific ways to make and use the embodiments and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
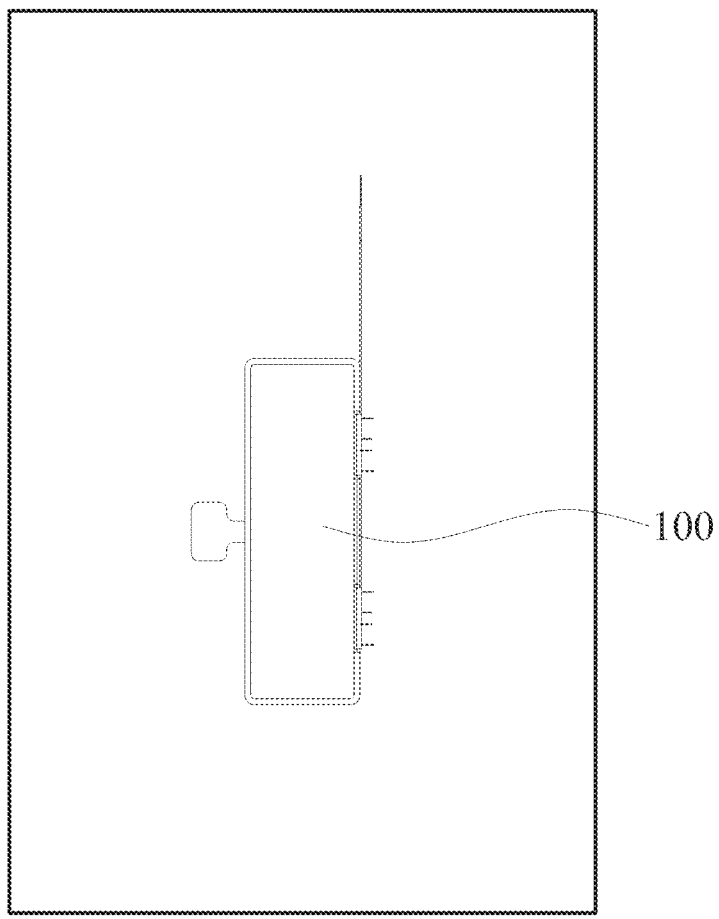
FIG. 1 shows an electronic device with a vibration module according to an embodiment of the invention.

Firstly, please refer to FIG. 1, a vibration module 100 of an embodiment of the present invention may be mounted into an electronic device 1 within for generating vibrations. The electronic device 1 may be, for example, a smart phone or a tablet. When generating vibrations, the vibration module 100 may receive a current from the outside of the vibration module 100 and generates an electromagnetic driving force, the electromagnetic driving force may interact with a magnetic field and makes the vibration module 100 to vibrate, thereby the user of the electronic device 1 may feel the vibration. It should be noted that the relation in position and size between the vibration module 100 and the electronic device 1 shown in FIG. 1 is only an example, but not limiting the relation in position and size between the vibration module 100 and the electronic device 1. In fact, the vibration module 100 may be mounted at different positions in the electronic device 1 according to the different needs.

Figure 2A:
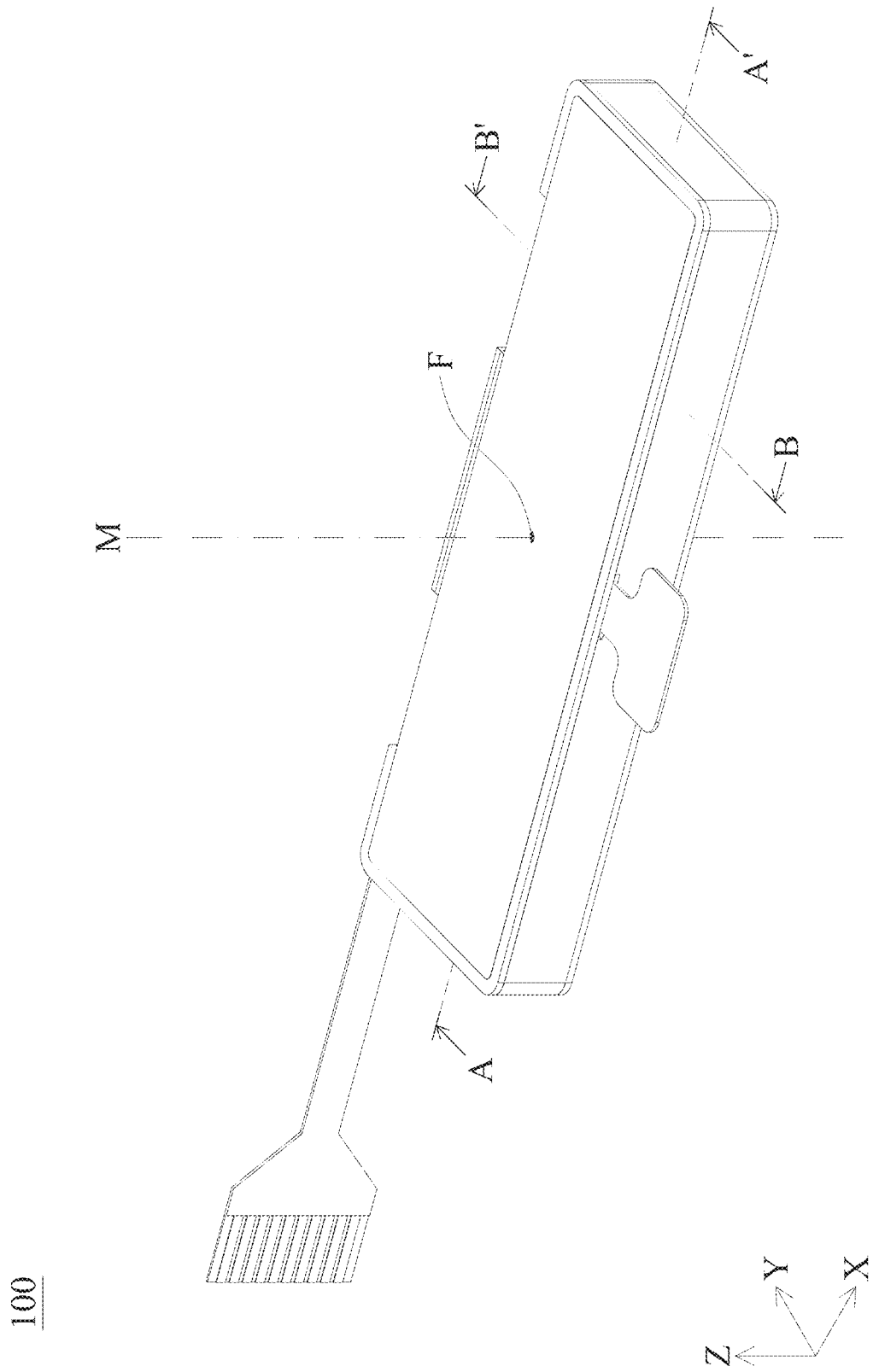
FIG. 2A shows a perspective view of the vibration module according to an embodiment of the invention.
Figure 2B:
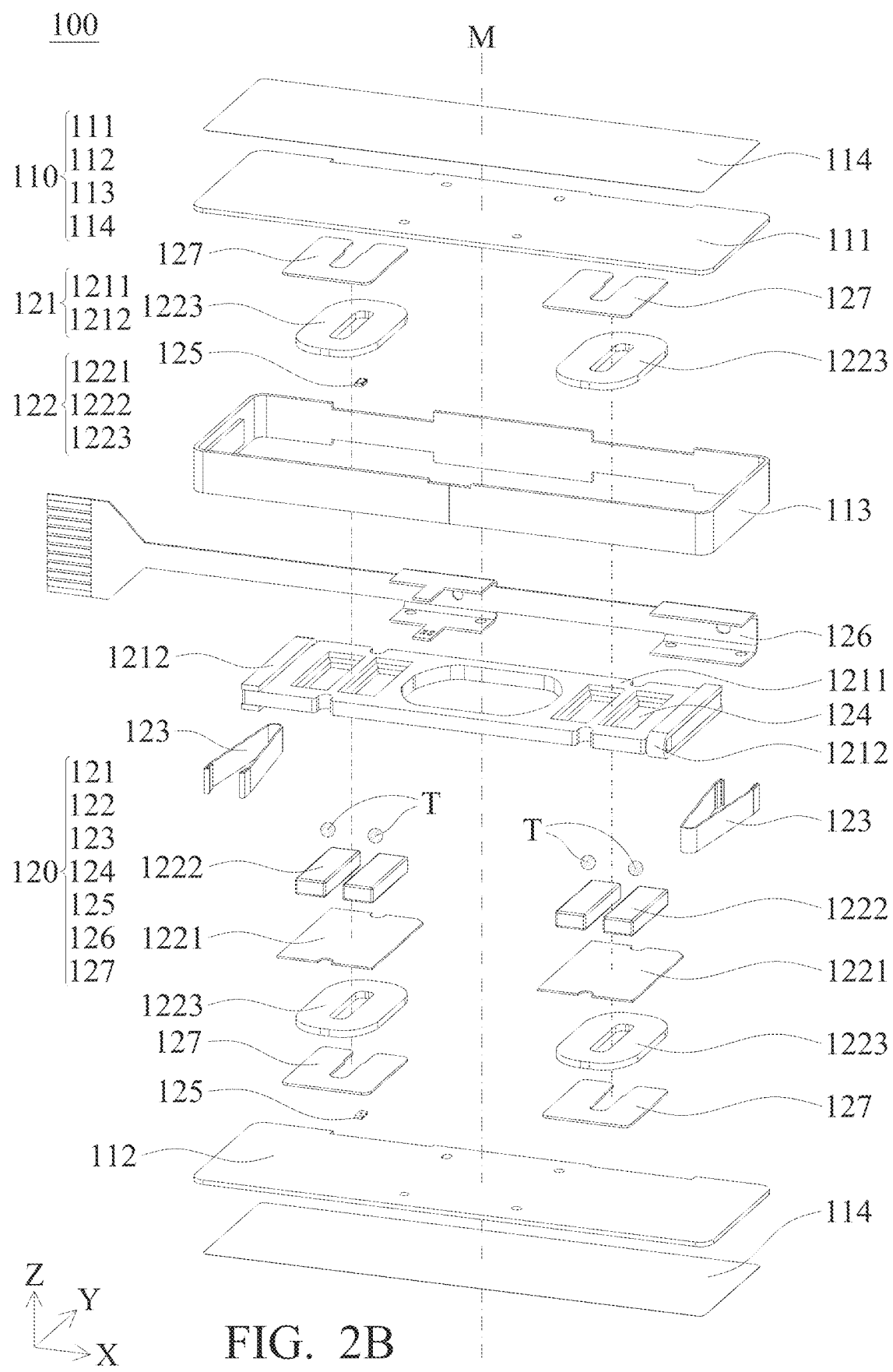
FIG. 2B shows an exploded view of the vibration module according to an embodiment of the invention.

Please refer to FIGS. 2A and 2B, FIG. 2A is a perspective view of the vibration module 100, and FIG. 2B is an exploded view of the vibration module 100. As shown in FIG. 2A, the vibration module 100 has a main axis M, the main axis M passes through a center F of the vibration module 100. As shown in FIG. 2B, the vibration module 100 includes a fixed part 110, a first vibration part 120 and a connecting member T. The fixed part 110 includes a top plate 111, a bottom plate 112, an outer frame 113 and two cover elements 114. The first vibration part 120 includes a first moving member 121, two first driving assemblies 122, a first elastic element 123, a glue recess 124, a position sensing assembly 125, a first circuit assembly 126 and two supporting elements 127. The first moving member 121 includes a first moving member body 1211 and two first moving member connecting portions 1212. Each of the first driving assemblies 122 includes a magnetic conductive element 1221, a first magnetic element 1222 and two first coils 1223.

Figure 3A:
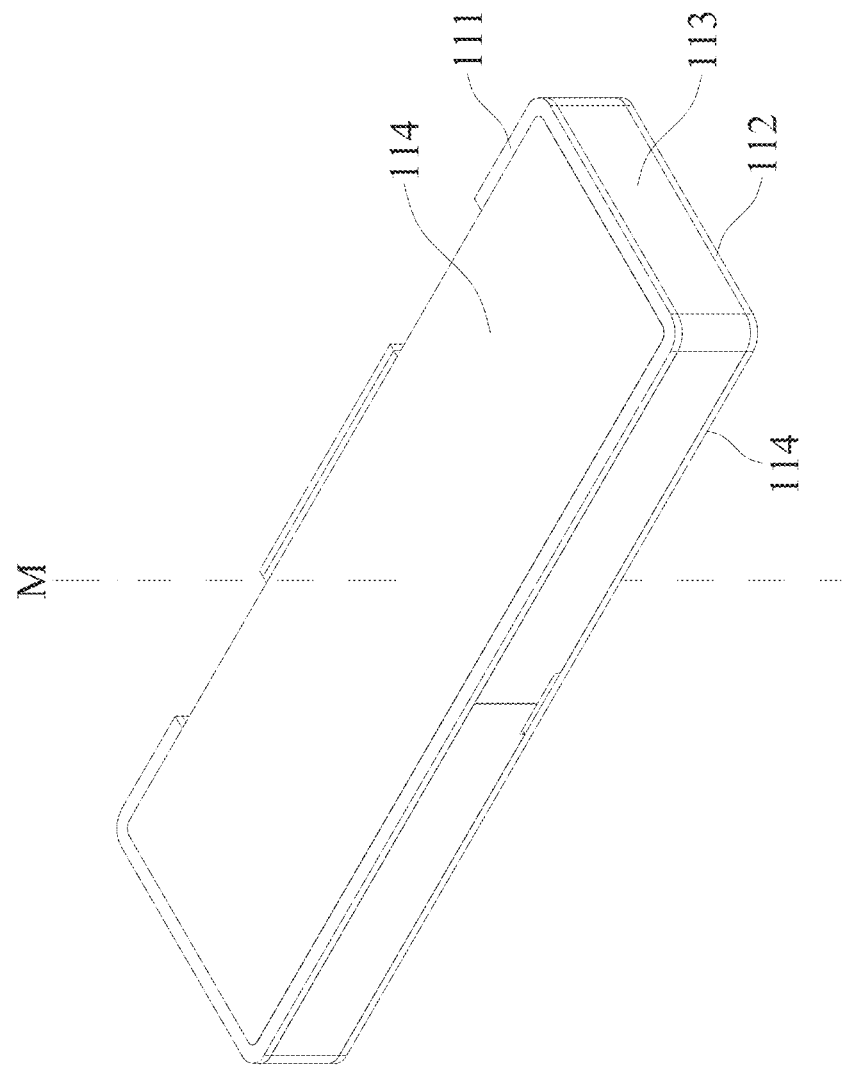
FIG. 3A shows a schematic view of a fixed part of the vibration module according to an embodiment of the invention.
Figure 3B:
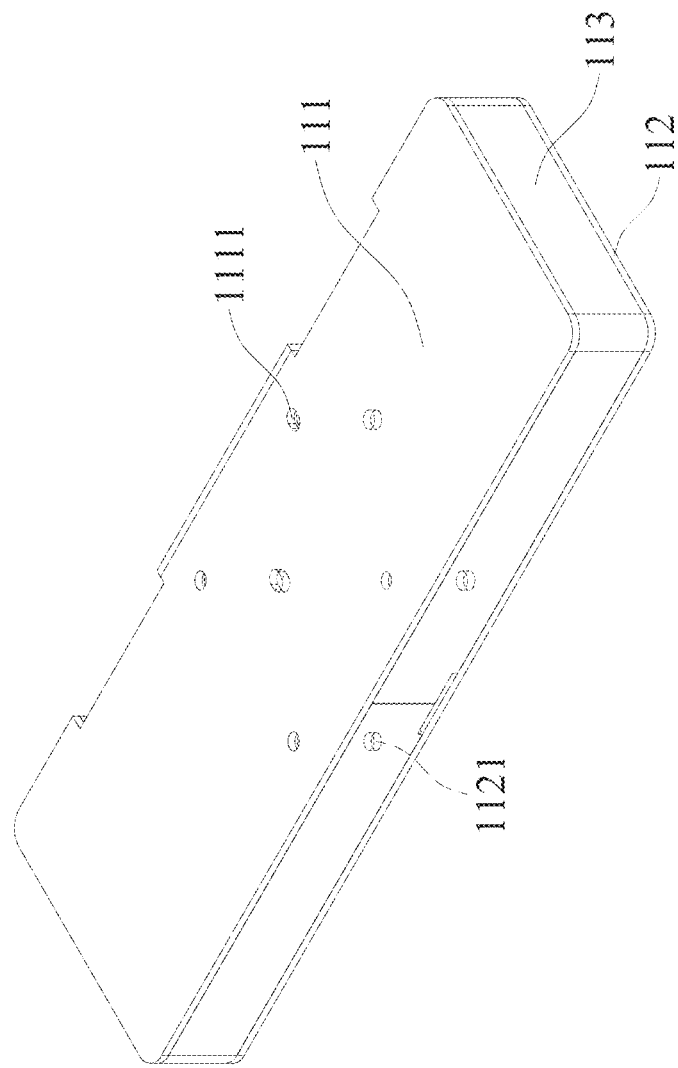
FIG. 3B shows a schematic view of a top plate, a bottom plate and an outer frame according to an embodiment of the invention.

Please refer to FIG. 3A, FIG. 3A is a schematic view of the fixed part 110 of the vibration module 100. The outer frame 113 is located between the top plate 111 and the bottom plate 112. The top plate 111 covers the upper portion of the outer frame 113, and the bottom plate 112 covers the lower portion of the outer frame 113. Therefore, the main axis M also passes through the top plate 111 and the bottom plate 112. The top plate 111, the bottom plate 112 and the outer frame 113 may be made of a non-ferromagnetic metal, and preferably the density of this non-ferromagnetic metal is greater than the density of a plastic material. Please refer to FIG. 3B, FIG. 3B is a schematic view of the top plate 111, the bottom plate 112 and the outer frame 113. The top plate 111 has a through hole 1111, and the bottom plate 112 has a through hole 1121, wherein the through hole 1121 is shown as a dashed line. The through hole 1111 and the through hole 1121 are helpful to position of the elements disposed in the vibration module 100 and the assembly of the vibration module 100.

Please refer to FIG. 3A again, the two cover elements 114 are located above the top plate 111 and below the bottom plate 112, respectively. The cover element 114 located above the top plate 111 covers the through hole 1111, and the cover element 114 located below the bottom plate 112 covers the through hole 1121. That is, the cover element 114 above the top plate 111 completely overlaps the through holes 1111, and the cover element 114 below the bottom plate 112 completely overlaps the through holes 1121 when viewed along the main axis M. Thus, the through hole 1111 and the through hole 1121 are not exposed to the outside, and thus avoiding the external dust or water entering the vibration module 100 via the through holes 1111 or the through hole 1121, thereby achieving the effects of waterproof and dustproof. The cover element 114 may be a shielding material such as a light-shielding sheet.

Figure 3C:
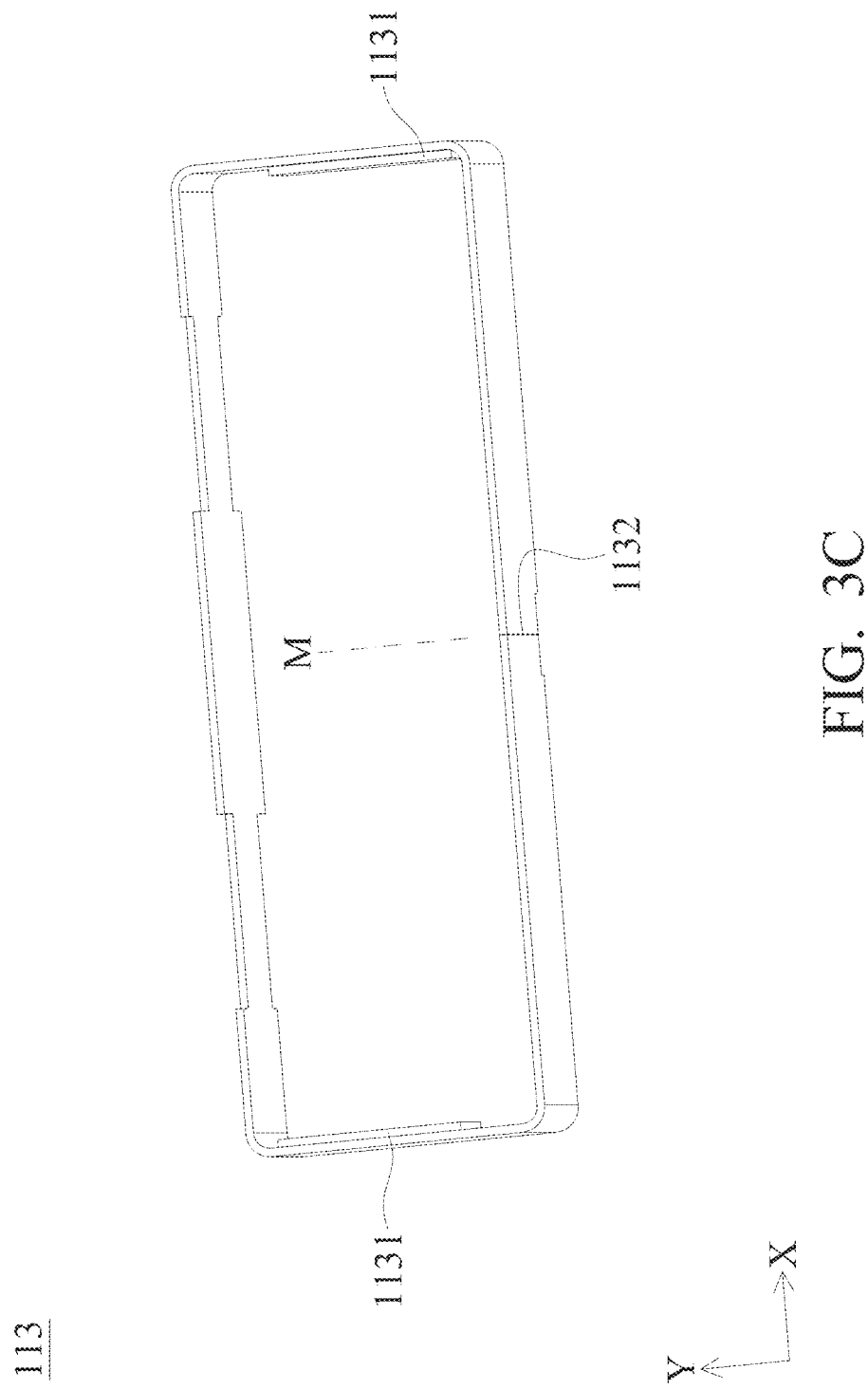
FIG. 3C shows a schematic view of the outer frame according to an embodiment of the invention.
Figure 3D:
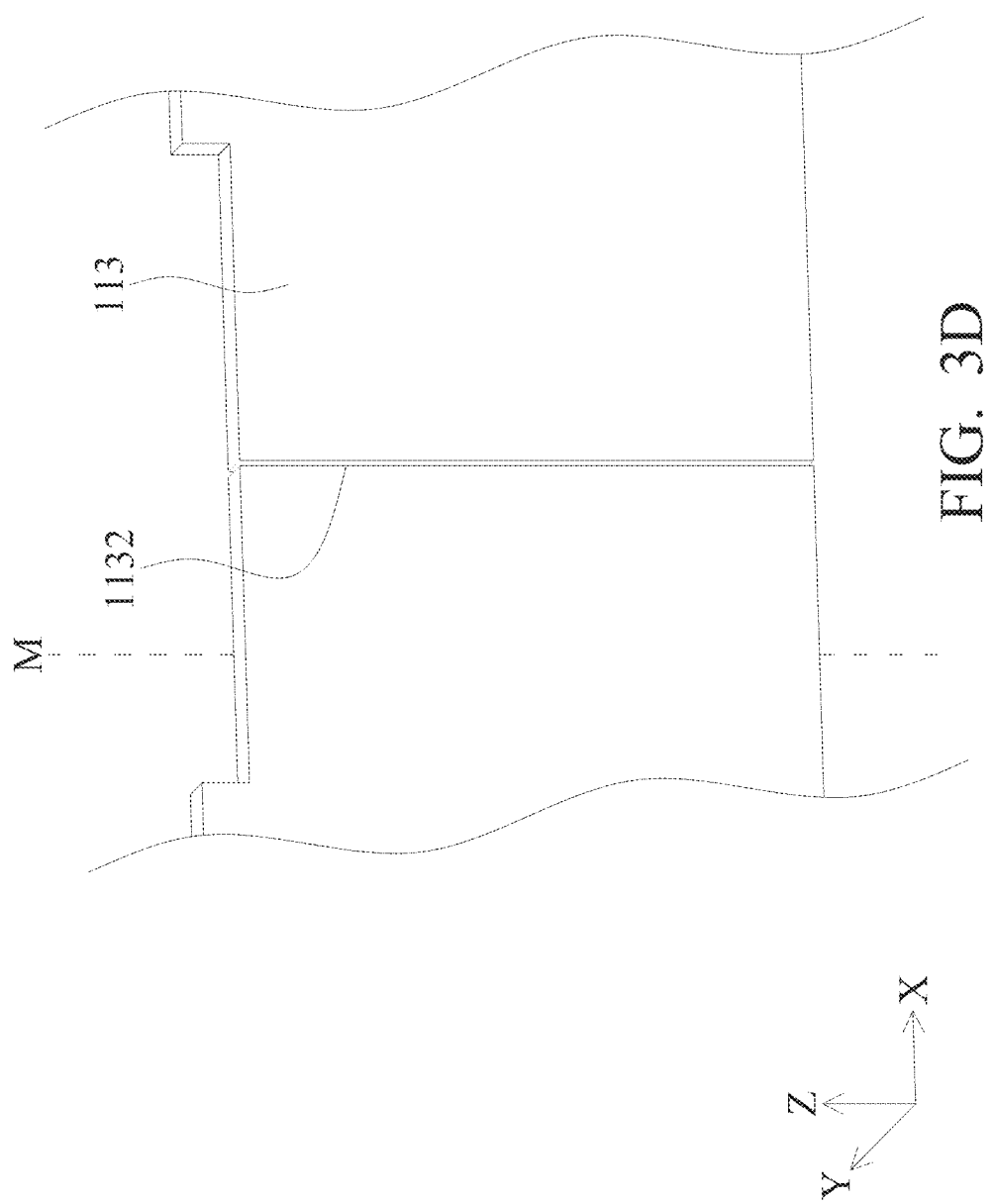
FIG. 3D shows a partial schematic view of the outer frame according to an embodiment of the invention.

FIG. 3C is a schematic view of the outer frame 113, and FIG. 3D is a partial schematic view of the outer frame 113. As shown in FIG. 3C, the outer frame 113 is shaped centered on the main axis M, and the outer frame 113 includes two welding portions 1131 and a gap 1132. The welding portions 1131 are located on both sides of the outer frame 113, and extends along the outer frame 113. As shown in FIG. 3D, the gap 1132 of the outer frame 113 traverse the outer frame 113 along the main axis M. That is, the outer frame 113 is disconnected at the gap 1132 by the gap 1132, therefore, the outer frame 113 is not circumferentially connected to be an integrity, and a circuit board, plastic member, solder, or the light-shielding sheet may be used to shield the gap 1132 to prevent foreign matters from entering the vibration module 100. In fact, the outer frame 113 may be a metal sheet which is bent and shaped, rather than cast molding, by centering on the main axis M. Thus, the complexity in manufacturing the vibration module 100 may be reduced, thereby reducing the cost in manufacturing the vibration module 100.

Figure 4A:
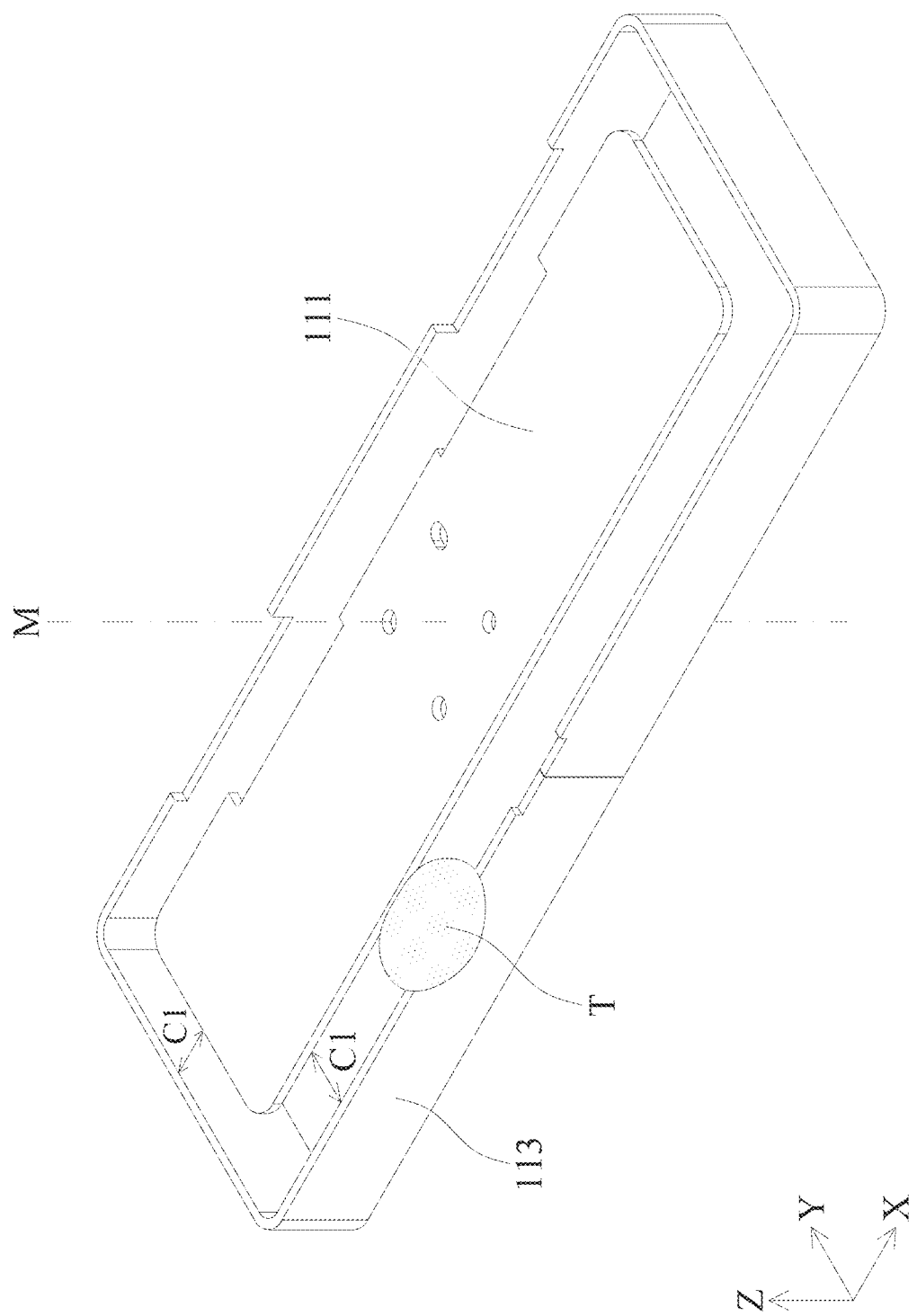
FIG. 4A shows a partial schematic view of the top plate and the outer frame according to an embodiment of the invention.
Figure 4B:
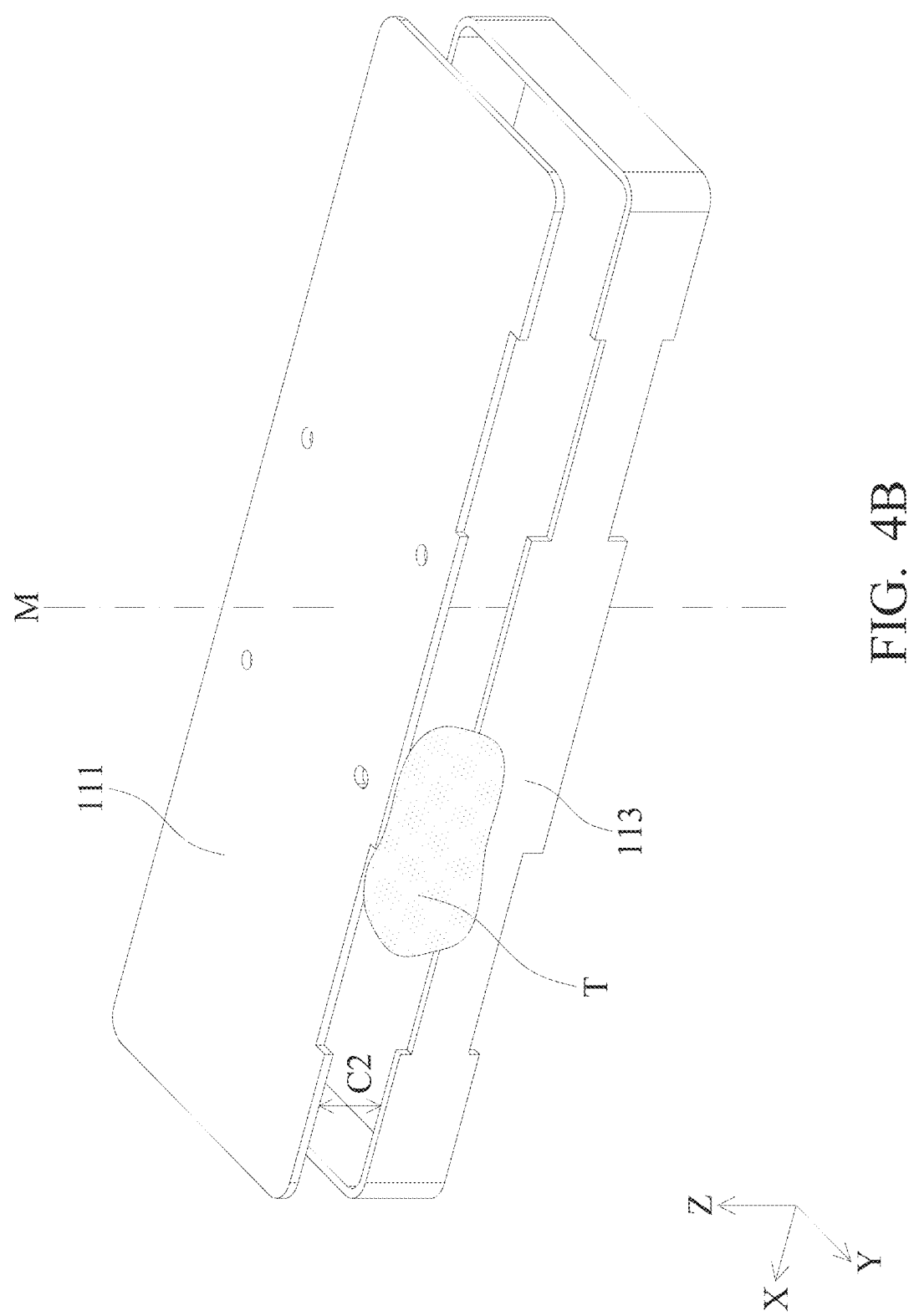
FIG. 4B shows a partial schematic view of the top plate and the outer frame according to another embodiment of the invention.

FIGS. 4A and 4B are partial schematic views of the top plate 111 and outer frame 113 according to different embodiments. As shown in FIG. 4A, in one embodiment, the top plate 111 is not directly connected to the outer frame 113, and there is a gap C1 between the top plate 111 and the outer frame 113 when viewed along the main axis M. As shown in FIG. 4B, in another embodiment, the top plate 111 is not directly connected to the outer frame 113, and there is a gap C2 between the top plate 111 and the outer frame 113 when viewed in a direction perpendicular to the main axis M. As shown in FIGS. 4A and 4B, the connecting member T is provided between the top plate 111 and the outer frame 113 to fix the top plate 111 to the outer frame 113. The connecting member T may be a light-shielding sheet, or a material such as solder or adhesive.

Figure 4C:
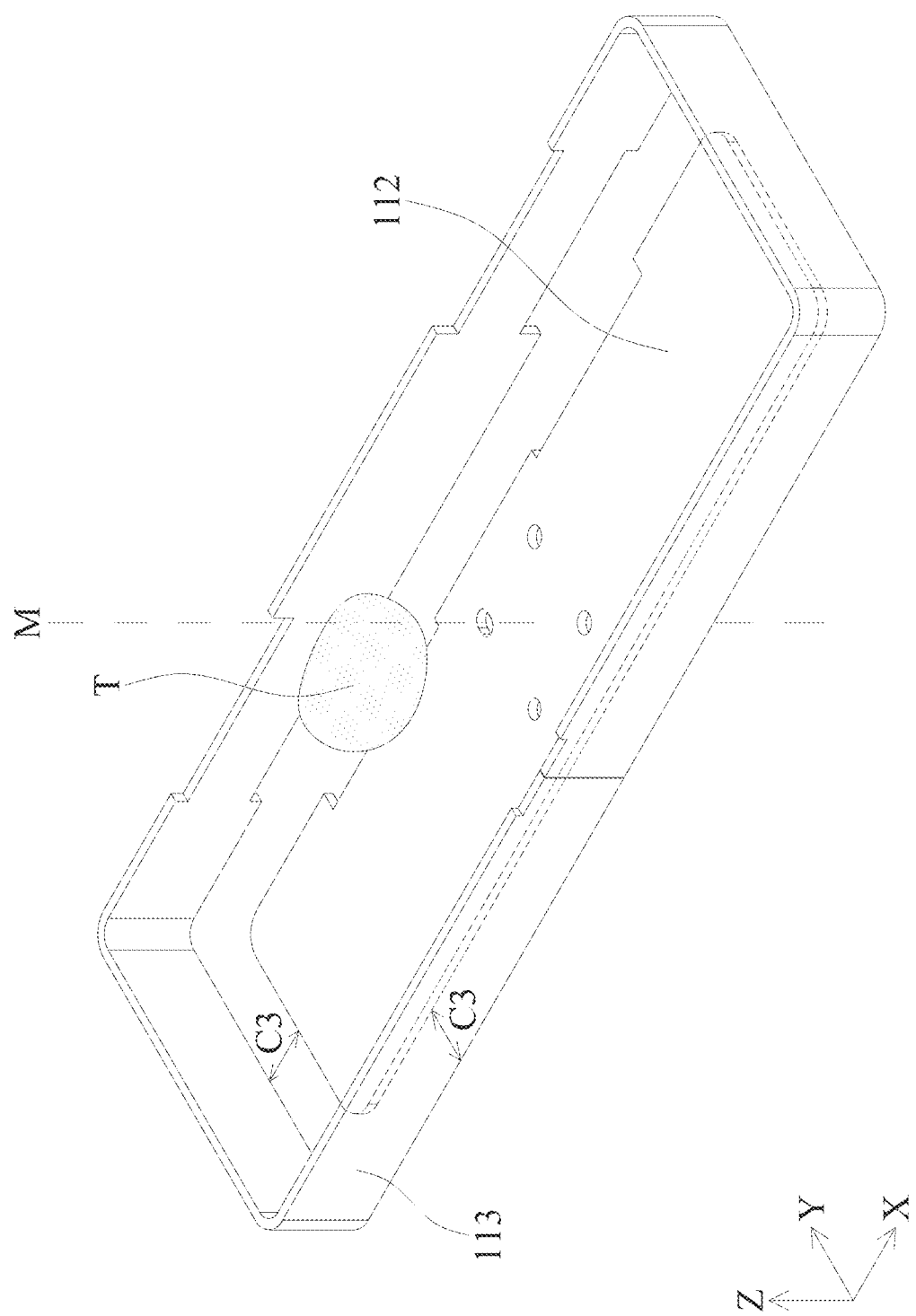
FIG. 4C shows a partial schematic view of the bottom plate and the outer frame according to an embodiment of the invention.
Figure 4D:
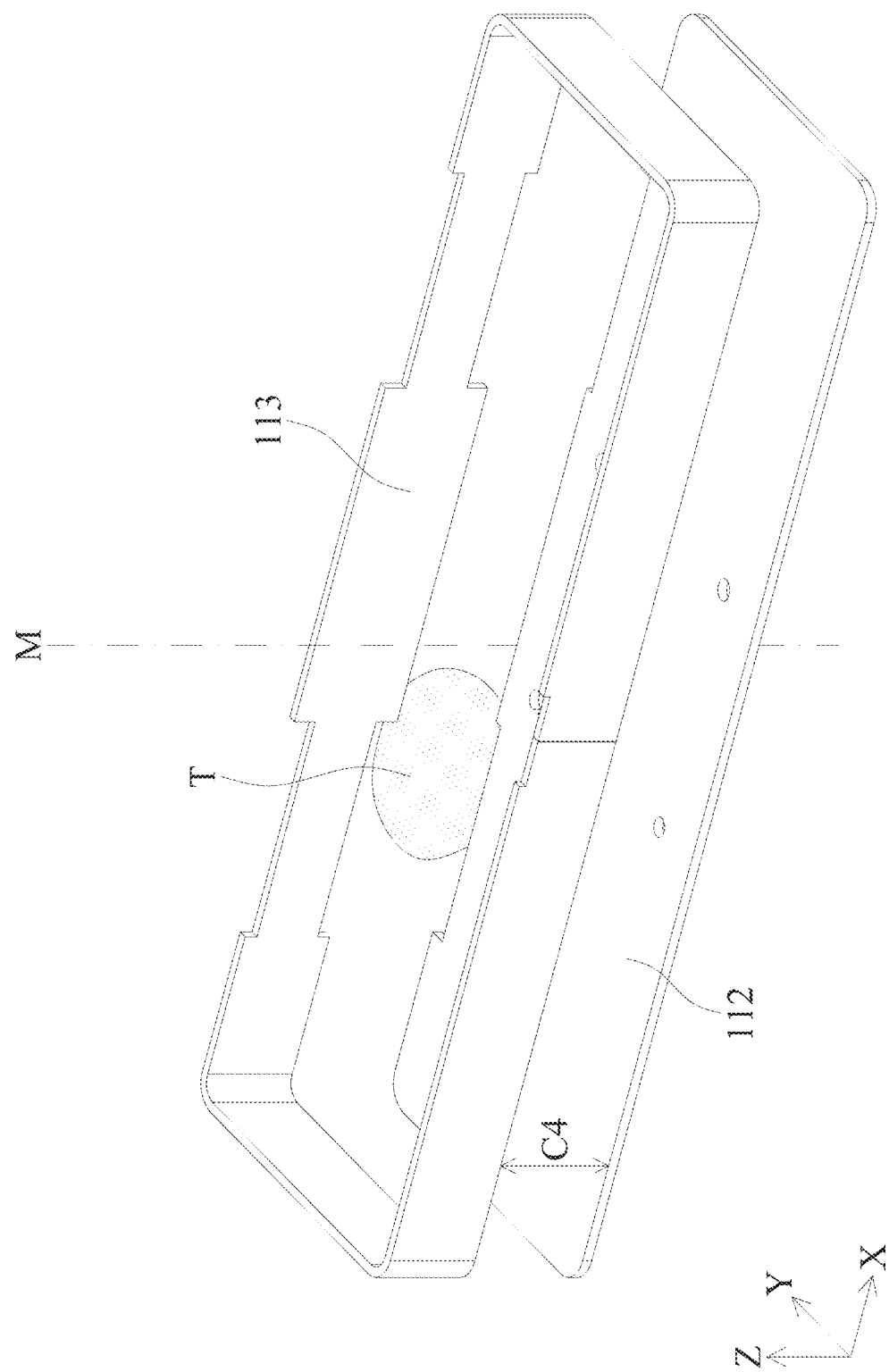
FIG. 4D shows a partial schematic view of the bottom plate and the outer frame according to another embodiment of the invention.

FIGS. 4C and 4D are partial schematic views of the bottom plate 112 and the outer frame 113 according to different embodiments. As shown in FIG. 4C, in one embodiment, the bottom plate 112 is not directly connected to the outer frame 113, and there is a gap C3 between the bottom plate 112 and the outer frame 113 when viewed along the main axis M. As shown in FIG. 4D, in another embodiment, the bottom plate 112 is not directly connected to the outer frame 113, and there is a gap C4 between the bottom plate 112 and the outer frame 113 when viewed in a direction perpendicular to the main axis M. As shown in FIGS. 4C and 4D, the connecting member T is provided between the bottom plate 112 and the outer frame 113 to fix the bottom plate 112 to the outer frame 113. The connecting member T may be a light-shielding sheet, or a material such as solder or adhesive.

Figure 5A:
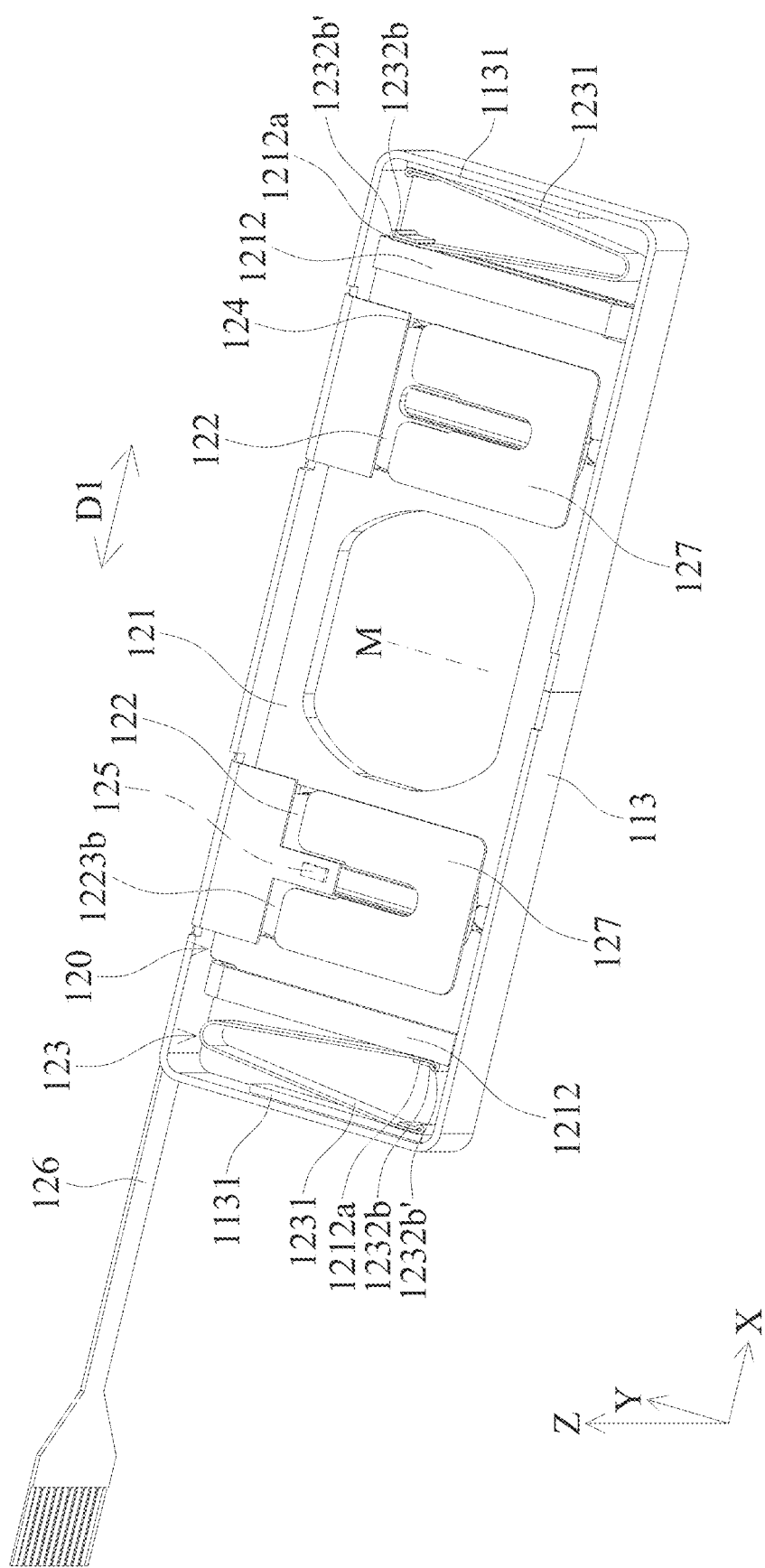
FIG. 5A shows a schematic view of the outer frame and a first vibration part according to an embodiment of the invention.
Figure 5B:
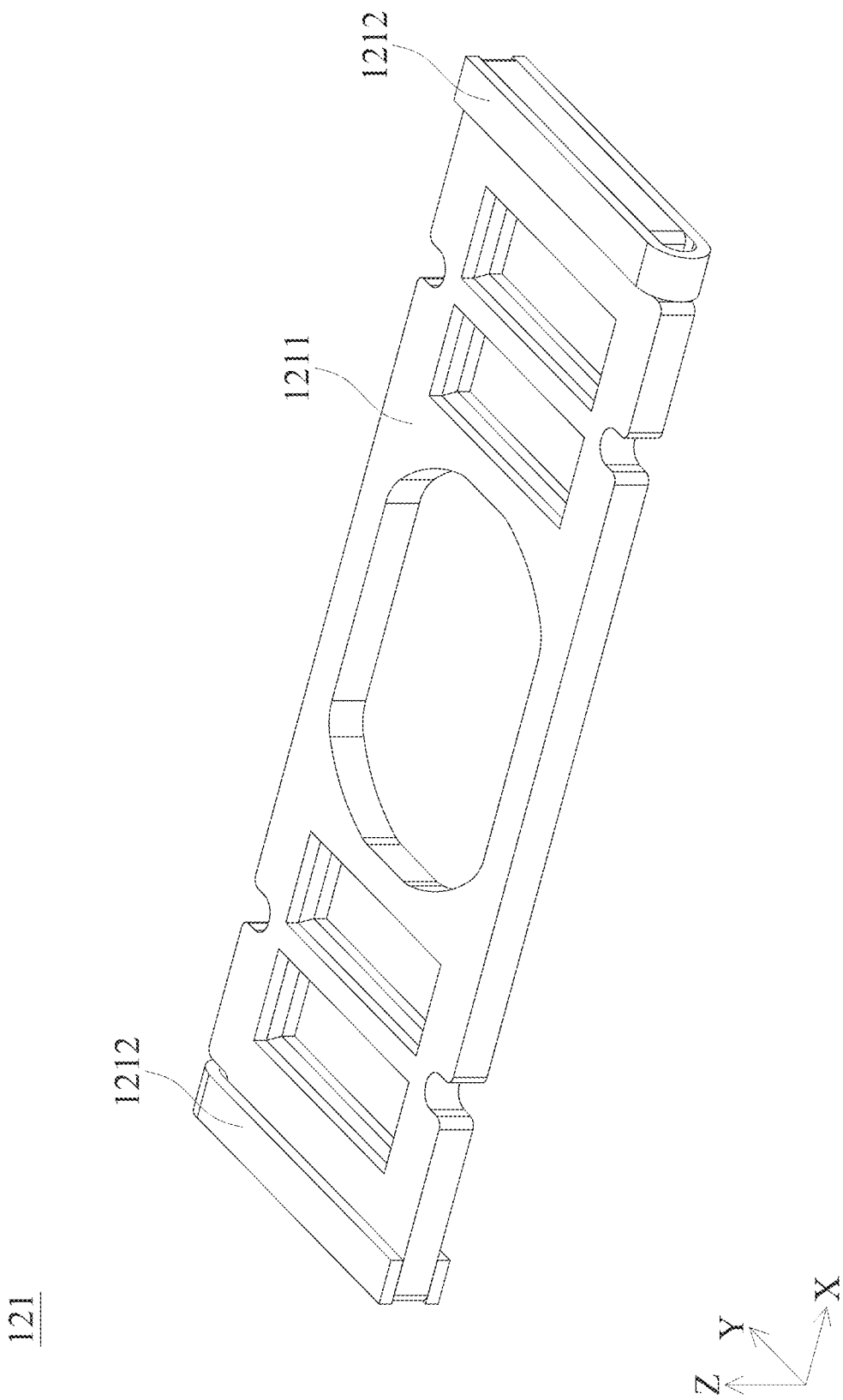
FIG. 5B shows a schematic view of a first moving member according to an embodiment of the invention.

FIG. 5A is a schematic view of the outer frame 113 and the first vibration part 120. As shown in FIG. 5A, the first vibration part 120 is disposed in the outer frame 113 of the fixed part 110. FIG. 5B is a schematic view of the first moving member 121. As shown in FIG. 5B, the first moving member 121 has a plate-like structure, and the outer frame 113 of the fixed part 110 is centered on the main axis M and surrounds the first moving member 121 (may refer to FIG. 5A). The first moving member connecting portion 1212 of the first moving member 121 protrudes from the first moving member body 1211.

Please refer to FIG. 5A, the first driving assemblies 122 are located at the different ends of the first moving member 121, and the first driving assemblies 122 drive the first moving member 121 to move relative to the fixed part 110. Specifically, the first driving assembly 122 drives the first moving member 121 to move relative to the fixed part 110 along a first direction D1, and the first direction D1 is not parallel to the main axis M. More specifically, the first direction D1 is perpendicular to the main axis M.

Figure 6:
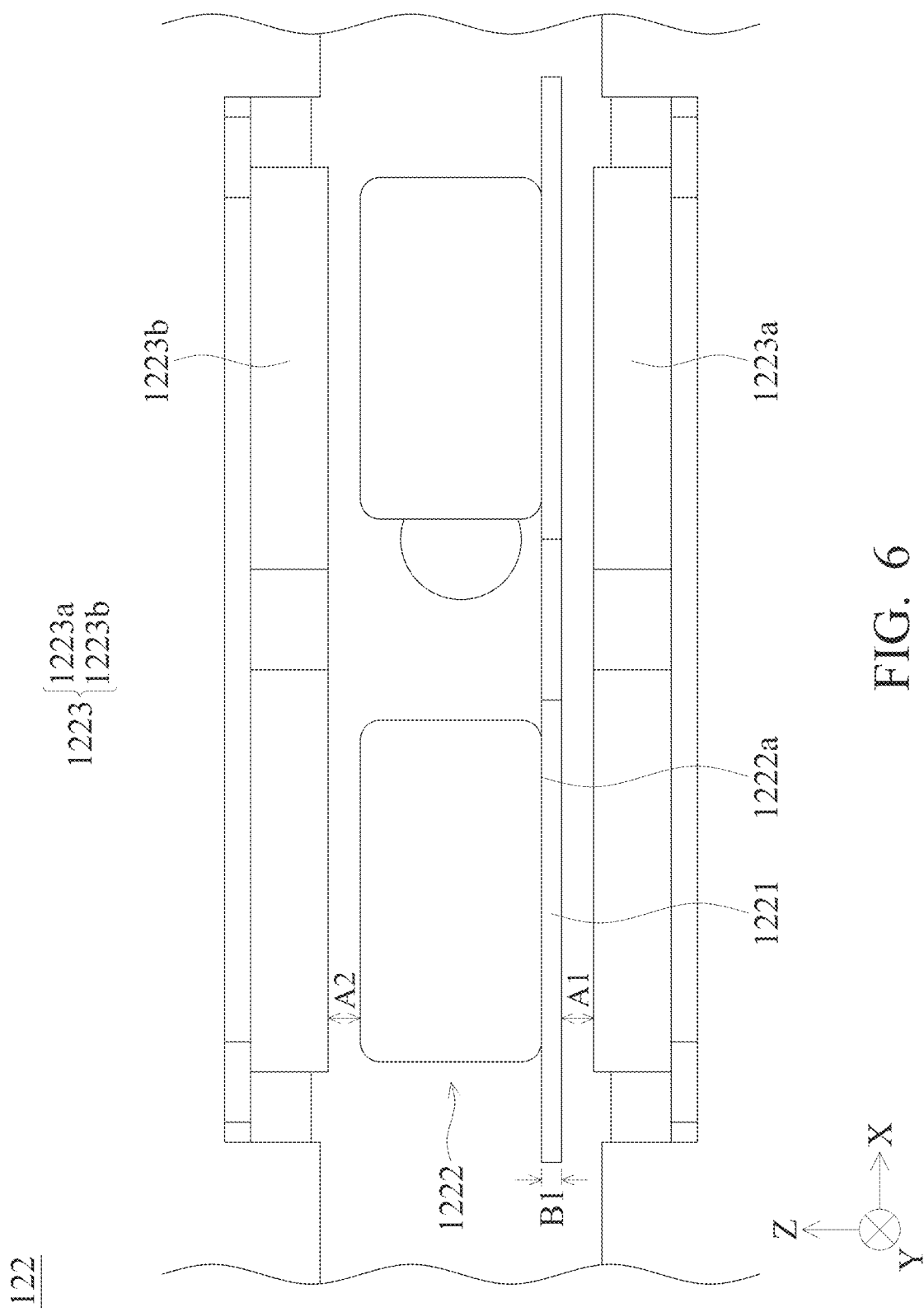
FIG. 6 shows a schematic view of a first driving assembly according to an embodiment of the invention.

Please refer to FIG. 6, FIG. 6 is a schematic view of the first driving assembly 122. In the embodiment shown in FIG. 6, each of the first driving assemblies 122 includes two first coils 1223. In some embodiments, each of the first driving assemblies 122 may include more than two first coils 1223. However, in other embodiments, each of the first driving assemblies 122 may include only one first coil 1223. The magnetic conductive element 1221 may be connected to the first moving member body 1211 (not shown in FIG. 6) of the first moving member 121 by soldering, welding or adhering. In one embodiment, the magnetic conductive element 1221 may have holes (not shown) to adjust the strength of the magnetic force generated by the first magnetic element 1222. The two first coils 1223 are respectively located above and below the first magnetic element 1222, the first coil 1223 located below the first magnetic member 1222 is first coil 1223a, and the first coil 1223 located above the first magnetic member 1222 is first coil 1223b. The first coil 1223a and the first coil 1223b at least partially overlap each other when viewed along the main axis M. The magnetic conductive element 1221 is disposed between the first magnetic element 1222 and the first coil 1223a. Specifically, the magnetic conductive element 1221 is disposed on a surface 1222a of the first magnetic element 1222 which faces the first coil 1223a. The first magnetic element 1222 may be a permanent magnet. In the present embodiment, the first magnetic element 1222 includes two permanent magnets, and the magnetic poles of the permanent magnets are staggered. That is, when the north seeking pole of one of the permanent magnets faces the magnetic conductive element 1221, the south seeking pole of another permanent magnet faces the magnetic conductive element 1221, and vice versa. The shortest distance A1 between the magnetic conductive element 1221 and the first coil 1223a is substantially the same as the shortest distance A2 between the first magnetic element 1222 and the first coil 1223b. Since the magnetic conductive element 1221 has a thickness B, the shortest distance between the first magnetic element 1222 and the first coil 1223a is different from the shortest distance between the first magnetic element 1222 and the first coil 1223b. Thus, during the operation, the deviation variables may be reduced so that the vibration module 100 is more stable.

Please refer to FIG. 5A again, the first elastic element 123 includes two springs 1231. In other embodiments, the first elastic element 123 may include more than two springs 1231. Each spring 1231 is fixedly connected to (e.g., welding) the first moving member connecting portion 1212 of the first moving member 121, and is fixed to the welding portion 1131 of the outer frame 113 by welding. Thus, the first moving member 121 may be movably connected to the frame 113 by the springs 1231, and the first moving member 121 is supported by the springs 1231 without contact with the bottom plate 112. The two springs 1231 are respectively located at both sides of the first moving member 121, and the springs 1231 are respectively disposed in the opposite directions. More specifically, the two springs 1231 respectively include a recessed structure, and the openings of the recessed structures face different directions. Thus, the first moving member 121 is prevented from generating movements along a direction other than the first direction D1. For example, the first moving member 121 may be prevented from generating movements along the main axis M or a direction perpendicular to the first direction D1.

FIG. 7 is a schematic view of the spring 1231. Each spring 1231 includes a first segment 1232, a second segment 1233, and a bent portion 1234. The first segment 1232 is connected to the second segment 1233 through the bent portion 1234. The boundary between the first segment 1232 and the bent portion 1234 is a dashed line W1, and the boundary between the second segment 1233 and the bent portion 1234 is a dashed line W2. The first segment 1232 includes a first straight section 1232a, a first bent section 1232b and a first folded section 1232c extending at different angles, wherein the boundary between the first straight section 1232a and the first bent section 1232b is a dashed line W3, and the boundary between the first bent section 1232b and the first folded section 1232c is a dashed line W4. The second segment 1233 includes a second straight section 1233a, a second bent section 1233b and a second folded section 1233c extending at different angles, wherein the boundary between the second straight section 1233a and the second bent section 1233b is a dashed line W5, and the boundary between the second bent section 1233b and the second folded section 1233c is a dashed line W6. The first bent section 1232b at least partially overlaps the second bent section 1233b when viewed along the direction perpendicular to the main axis M.

The first bent section 1232b extends from the dashed line W3, bends greater than 180 degrees and connects to the first folded section 1232c. The first bent section 1232b at least partially overlaps the first folded section 1232c when viewed along the direction perpendicular to the main axis M. Similarly, the second bent section 1233b extends from the dashed line W5, bends greater than 180 degrees and connects to the second folded section 1233c. The second bent section 1233b at least partially overlaps the second folded section 1233c when viewed along the direction perpendicular to the main axis M. Thus, the first bent section 1232b, the first folded section 1232c, the second bent section 1233b and the second folded section 1233c may be beneficial to the welding between the spring 1231 and the outer frame 113 and the first moving member connecting portion 1212, and may prevent the spring 1231 from breaking.

Please refer to FIG. 5A again, the first bent section 1232b is fixedly connected to (e.g., welding) first moving member connecting portion 1212 of the first moving member 121. A surface 1232b' of the first bent section 1232b is flush with a surface 1212a of the first moving member connecting portion 1212, and is not parallel to the main axis M.

Figure 8A:
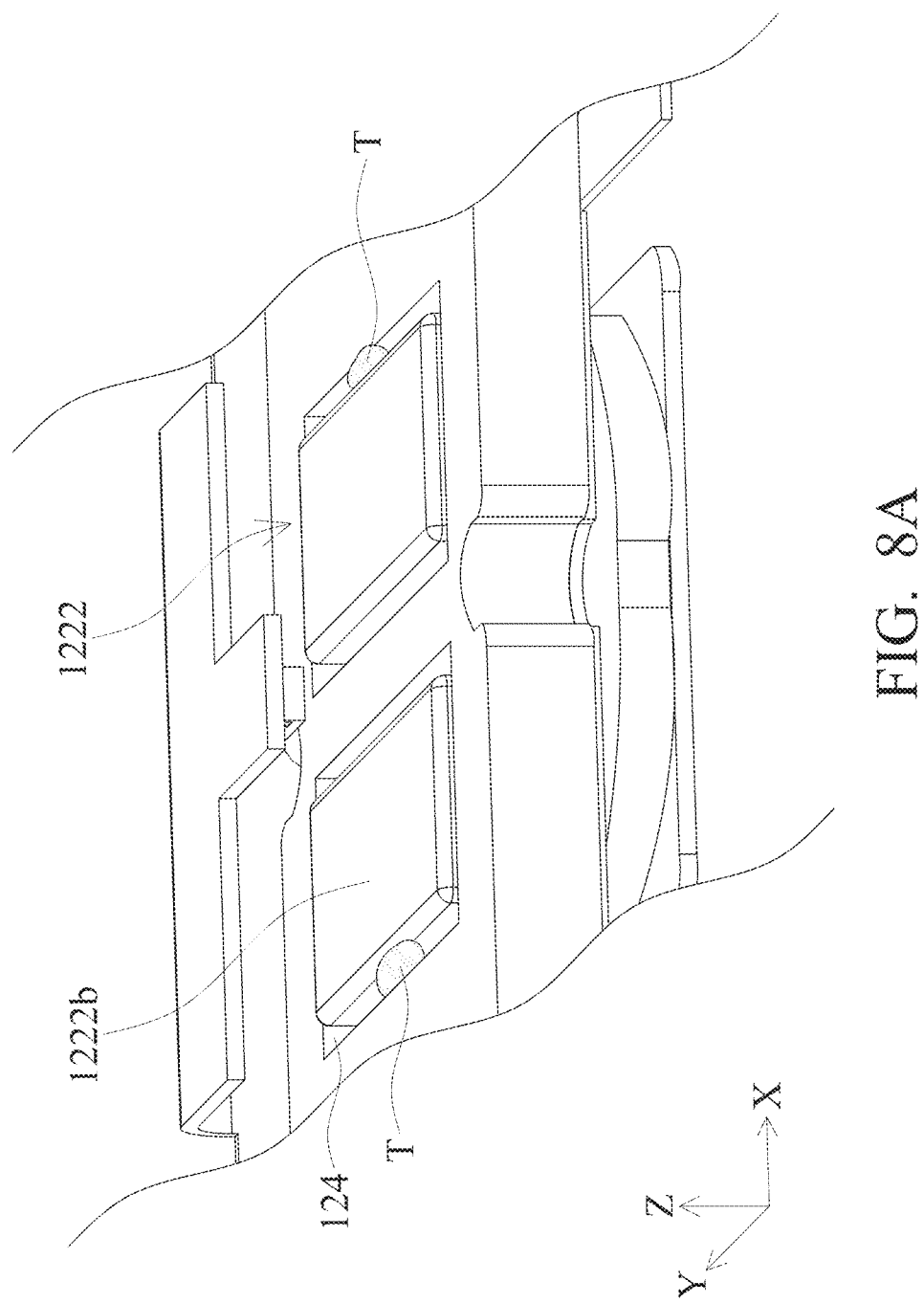
FIG. 8A shows a schematic view of a first magnetic element and a glue recess according to an embodiment of the invention.
Figure 8B:
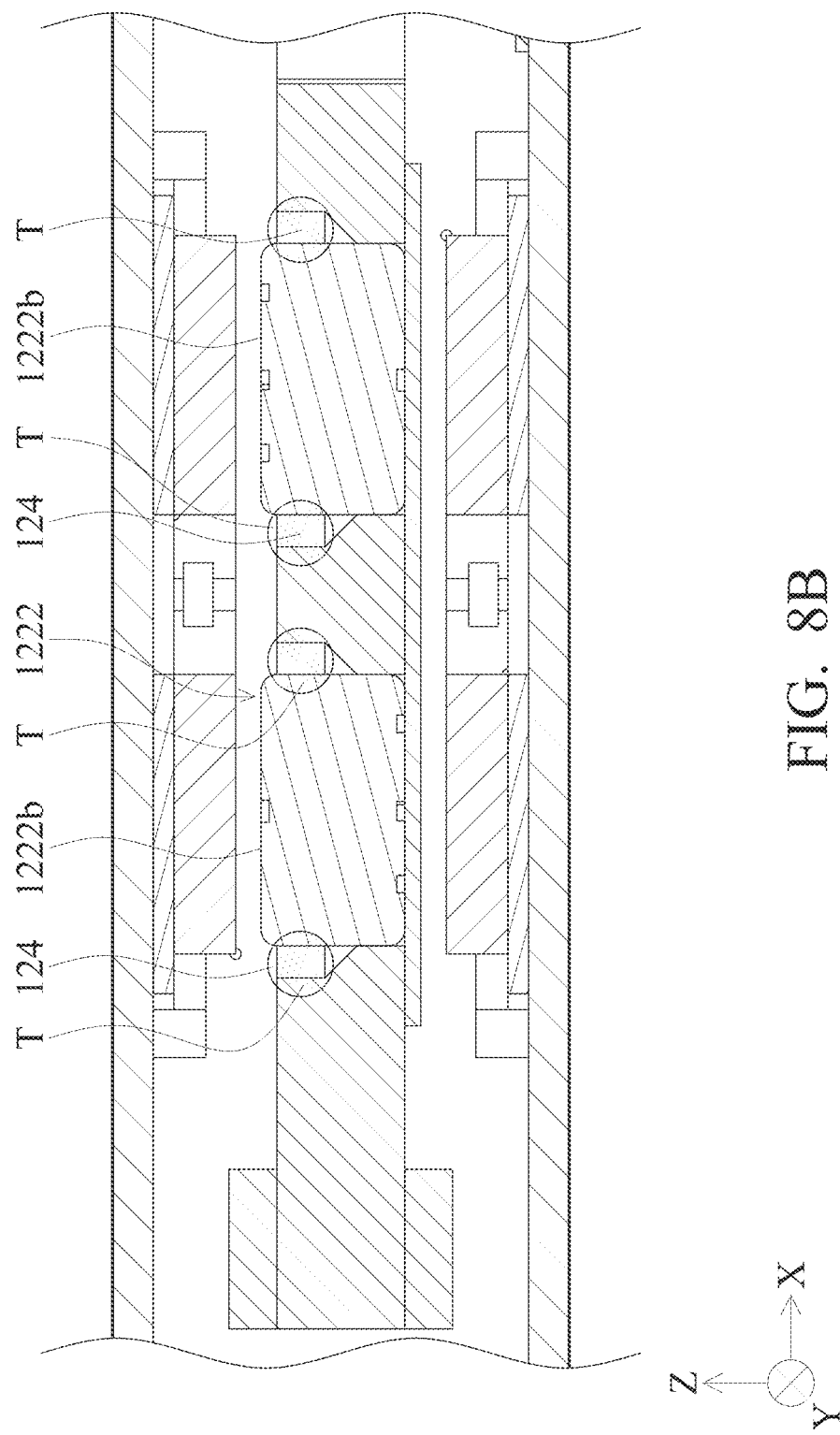
FIG. 8B shows a partial cross-sectional view along line A-A in FIG. 2A according to an embodiment of the present invention.

Please refer to FIGS. 8A and 8B at the same time, FIG. 8A is a schematic view of a first magnetic element 1222 and the glue recess 124, FIG. 8B is a partial cross-sectional view along line A-A in FIG. 2A. The glue recess 124 is disposed adjacent to the first magnetic element 1222. A surface 1222b (the surface of the first magnetic element 1222 which is not disposed with the magnetic conductive element 1221) of the first magnetic element 1222 which faces the first coil 1223b protrudes from the glue recess 124. Thus, a shortest distance A1 between the magnetic conductive element 1221 and the first coil 1223a is substantially the same as a shortest distance A2 between the surface 1222b and the first coil 1223b (may refer to FIG. 6). Similarly, during the operation, the deviation variables may be reduced so that the vibration module 100 is more stable. The glue recess 124 may be provided with the connecting member T to fix the magnetic conductive element 1221. The connecting member T disposed in the glue recess 124 may be a fixing material such as glue.

Please refer to FIG. 9A, FIG. 9A is a schematic view of the first coil 1223 and the position sensing assembly 125. The position sensing assembly 125 may include a Hall sensor, which is disposed on the first circuit assembly 126 (not shown in FIG. 9A, may refer to the position sensing assembly 125 shown in dashed line in FIG. 5A), and the position sensing assembly 125 senses the movement of the first moving member 121 relative to the fixed part 110. More specifically, the position sensing assembly 125 may sense the movement of the first moving member 121 along the first direction D1 relative to the fixed part 110. As shown in FIG. 9A, there is a non-zero distance S between the center of the position sensing assembly 125 and a winding axis 1123a of the first coil 1223. Thus, the miniaturization of the vibration module 100 may be achieved, and the risk of damage caused by excess extension of the first circuit assembly 126 may be prevented. The position sensing assembly 125 may also sense the vibration frequency of the vibration module 100 to determine the vibration frequency of the vibration module 100 if the vibration frequency of the vibration module 100 is the desired vibration frequency.

Figure 9B:
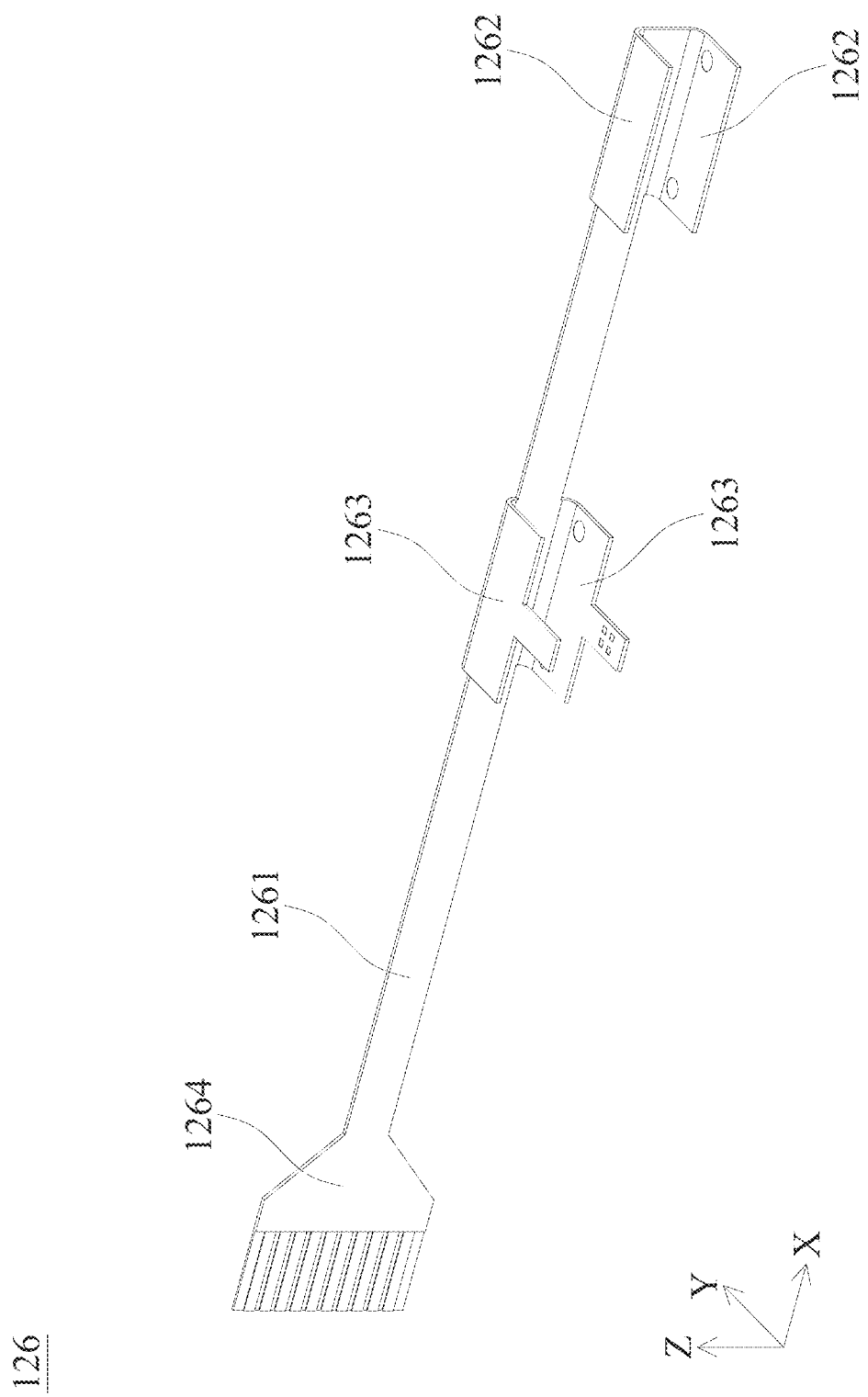
FIG. 9B shows a schematic view of a first circuit assembly according to an embodiment of the invention.

Please refer to FIG. 9B, FIG. 9B is a schematic view of the first circuit assembly 126. The first circuit assembly 126 has a first circuit assembly body 1261, two first extending portions 1262, two second extending portions 1263 and an external connecting portion 1264. The first circuit assembly body 1261 has a long plate shape. The first extending portion 1262 and the second extending portion 1263 respectively extend from the upper and the lower of the first circuit element body 1261, so as to be electrically connected to the first coil 1223 (refer to FIG. 5A). The second extending portion 1263 is provided with the position sensing assembly 125 (see FIG. 5A). The external connecting portion 1264 extends from the first circuit assembly body 1261 and receives external current. Therefore, the first circuit assembly 126 may direct external current to the first coil 1223.

Figure 10B:
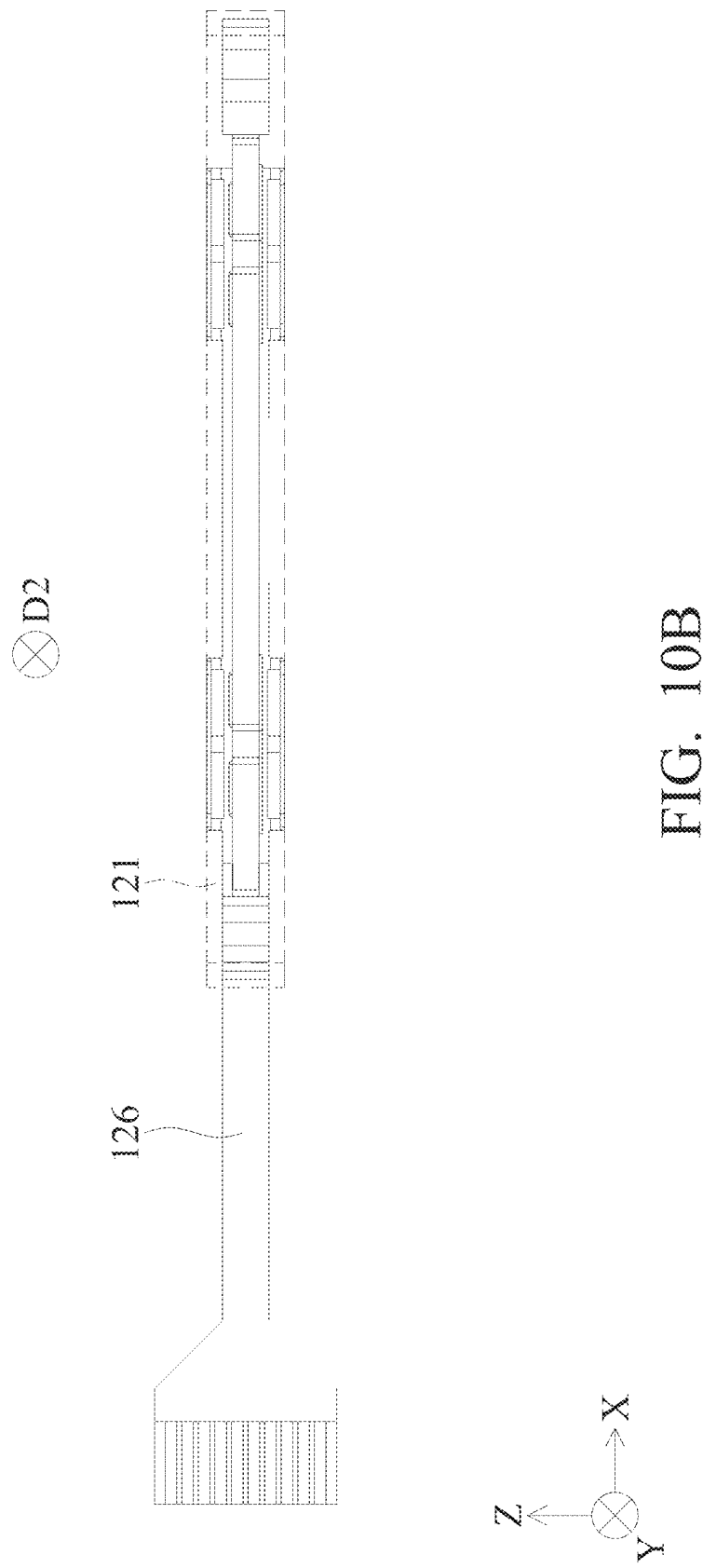
FIG. 10B shows a schematic view of the first moving member and the first circuit assembly viewed along a second direction according to an embodiment of the invention.

Please refer to FIG. 5 again, and refer to FIGS. 10A and 10B, FIG. 10A is a schematic view of the first moving member 121 and the first circuit assembly 126 viewed along the first direction D1, and FIG. 10B is a schematic view of the first moving member 121 and the first circuit assembly 126 viewed along a second direction D2, wherein the second direction D2 is not parallel to the main axis M and the first direction D1. As shown in FIG. 5A, the first circuit assembly 126 extends to the upper of the first coil 1223b, so as to be electrically connected to the first coil 1223b. The first moving member 121 at least partially overlaps the first circuit assembly 126 when viewed along the main axis M. As shown in FIG. 10A, the first circuit assembly 126 extends to the lower of the first coil 1223a, so as to be electrically connected to the first coil 1223a. The first moving member 121 does not overlap the first circuit assembly 126 when viewed along the first direction D1 which is not parallel to the main axis M. As shown in FIG. 10B, the first moving member 121 (shown as a dashed line) at least partially overlaps the first circuit assembly 126 when viewed along the second direction D2. Specifically, as shown in FIG. 10A, the first circuit assembly 126 generally appears to a C or C shape when viewed along the first direction D1, and a portion of the first moving member 121 is accommodated between the circuit assembly 126 in the C or C shape. Thus, the first circuit assembly 126 may be electrically connected to the first coil 1223a and the first coil 1223b, and the extending length of the first circuit assembly 126 is reduced, so as to achieve the effect of miniaturization. The first circuit assembly 126 is electrically connected to each of the first driving assembly 122, so as to supply current to the first driving assemblies 122, so that the first driving assembly 122 may drive the first moving member 121 to move.

Figure 11A:
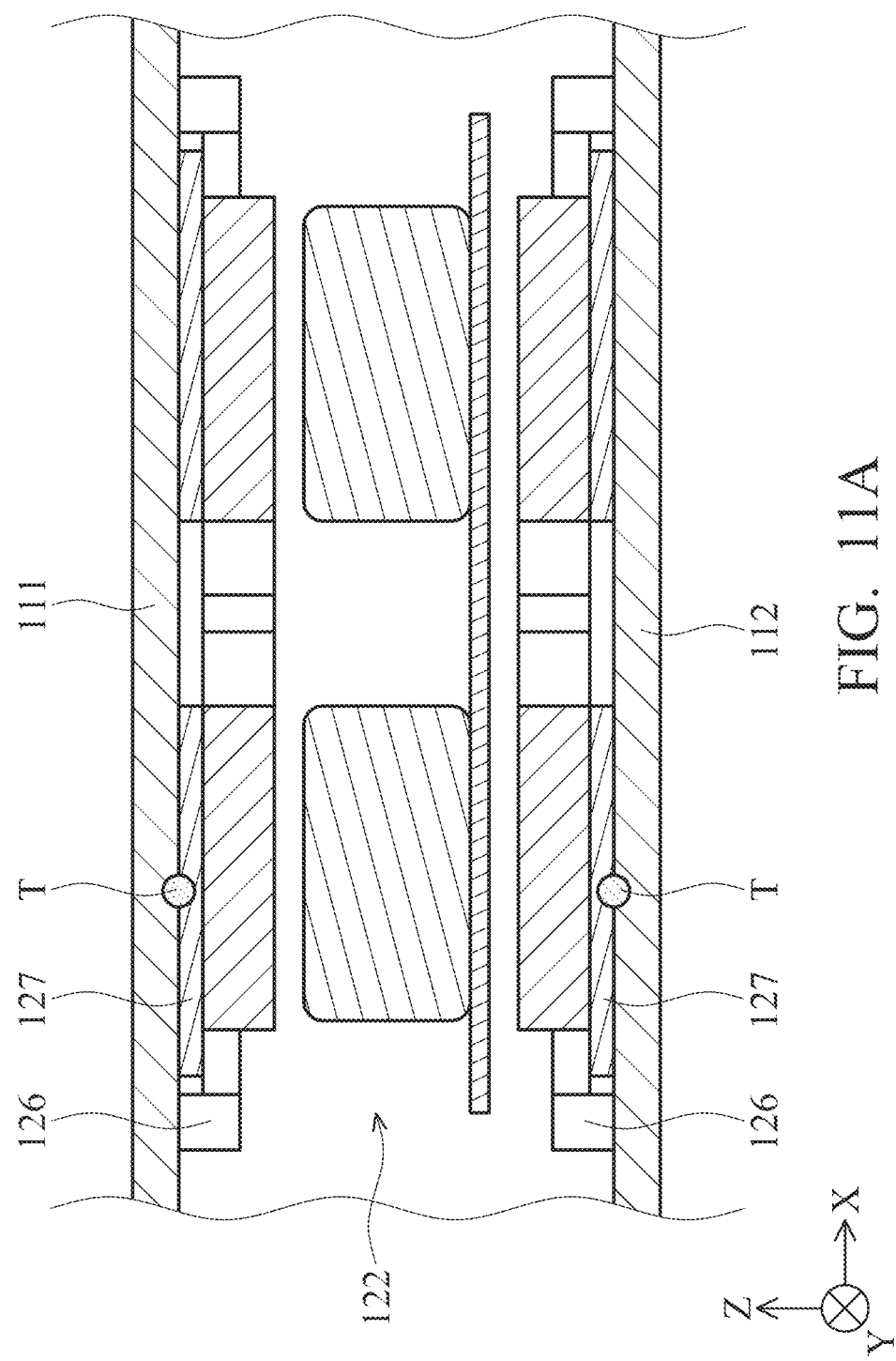
FIG. 11A shows a schematic view of the first driving assembly and a supporting element according to an embodiment of the invention.
Figure 11B:
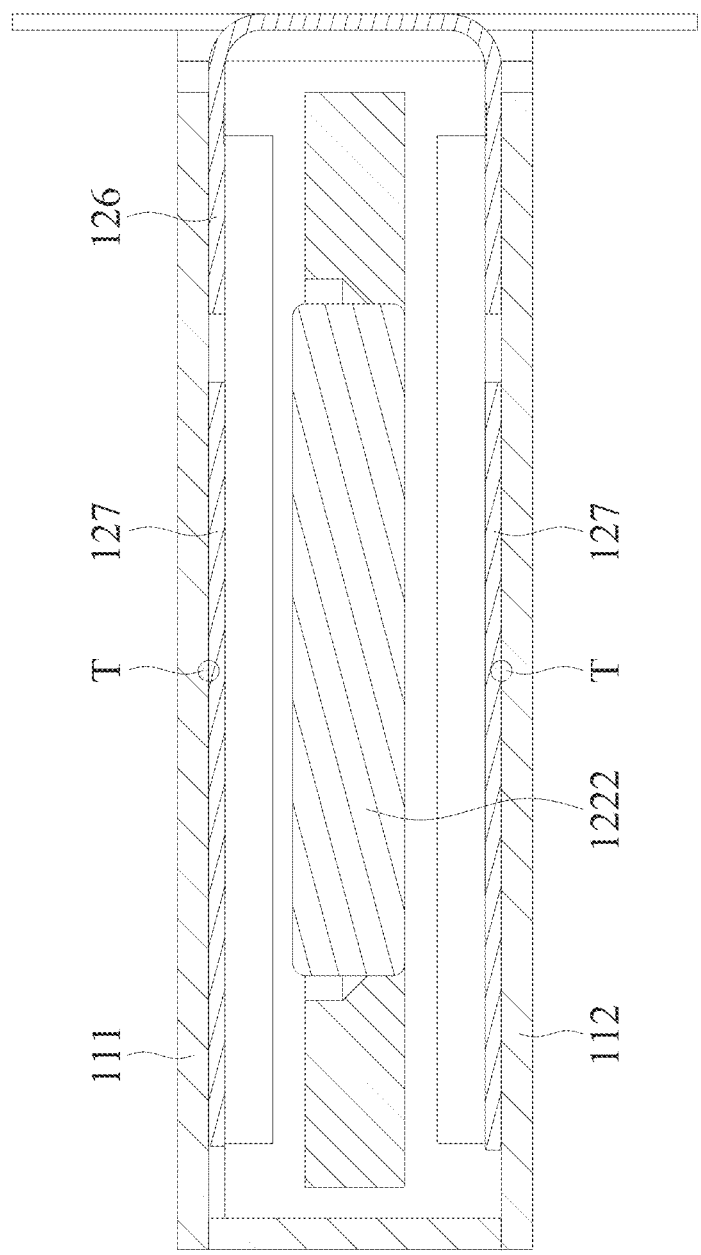
FIG. 11B shows a cross-sectional view along line B-B in FIG. 2A according to an embodiment of the present invention.

Please refer to FIGS. 11A and 11B at the same time, FIG. 11A is a schematic view of one of the first driving assemblies 122 and the supporting element 127, FIG. 11B is a cross-sectional view along line B-B in FIG. 2A. As shown in FIGS. 11A and 11B, the supporting element 127 is disposed between the first driving assembly 122 and the top plate 111 and the bottom plate 112 of the fixed part 110. The first circuit assembly 126 at least partially overlaps the supporting element 127 when viewed along the direction perpendicular to the main axis M. Specifically, the first circuit assembly 126 is aligned with the supporting element 127 when viewed along the direction perpendicular to the main axis M. Thus, it is easier to connect the first vibration part 120 to the top plate 111 and the bottom plate 112 of the fixed part 110. The connecting member T may be disposed between the top plate 111 and the bottom plate 112 and the supporting element 127, so that the first vibration part 120 is connected to the top plate 111 and the bottom plate 112. The connecting member T which connects the first vibration part 120 to the top plate 111 and the bottom plate 112 may be solder or adhesives. The supporting element 127 may be made of metals. In one embodiment, the supporting element 127 may be made of ferromagnetic metals or ferromagnetic alloys, e.g. ferromagnetic metals such as iron, cobalt, nickel, and the likes or alloys thereof. In another embodiment, the supporting element 127 may be made of non-ferromagnetic metals or non-ferromagnetic alloys.

In summary, the embodiments of the present invention provide the vibration module 100 capable of generating a stable vibration in a single direction, and the vibration module 100 disclosed in the embodiments of the present invention has a lower manufacturing cost and has been miniaturized.

Although embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, the scope of the present disclosure is defined by the scope of the appended claims. In addition, each scope of the claims is constructed as a separate embodiment, and various combinations of the claims and combinations of embodiments are within the scope of the present disclosure.

What is claimed is:

1. A vibration module, having a main axis passing through a center of the vibration module, comprising:
    a fixed part; and
    a first vibration part, disposed within the fixed part, comprising:
    a first moving member; and
    a first driving assembly driving the first moving member to move relative to the fixed part,
    wherein the first driving assembly comprises a magnetic conductive element, a first magnetic element and a first coil corresponding to the first magnetic element, the magnetic conductive element is disposed between the first magnetic element and the first coil.

2. The vibration module as claimed in claim 1, wherein the fixed part comprises an outer frame centered on the main axis and surrounds the first moving member, and the outer frame has a gap, the gap traverses the outer frame along the main axis.

3. The vibration module as claimed in claim 1, wherein the fixed part comprises:
    a bottom plate, having a through hole, wherein the main axis passes through the bottom plate; and
    a cover element, covering the through hole.

4. The vibration module as claimed in claim 1, wherein the fixed part comprises:
    an outer frame, centered on the main axis and surrounding the first moving member; and
    a bottom plate, having a through hole, wherein the main axis passes through the bottom plate, wherein a gap is provided between the outer frame and the bottom plate when viewed along the main axis or along a direction perpendicular to the main axis.

5. The vibration module as claimed in claim 1, wherein the first circuit assembly at least partially overlaps the first moving member when viewed along the main axis;

the first circuit element does not overlap the first moving member when viewed along a first direction not parallel to the main axis;

the first circuit assembly at least partially overlaps the first moving member when viewed along a second direction not parallel to the first direction and the main axis.

6. The vibration module as claimed in claim 1, wherein the first driving assembly drives the first moving member to move in a first direction, and the first direction is not parallel to the main axis.

7. The vibration module as claimed in claim 1, wherein the first driving assembly further comprises two first coils respectively disposed on both sides of the first magnetic element, the first coils at least partially overlap each other when viewed along the main axis, and shortest distances between the first magnetic element and each of the first coils are different.

8. The vibration module as claimed in claim 7, wherein a surface of the first magnetic element facing the first coil is provided with the magnetic conductive element.

9. The vibration module as claimed in claim 8, wherein a shortest distance between the magnetic element and the other first coil is substantially the same as a shortest distance between the magnetic conductive element and one of the first coils.

10. The vibration module as claimed in claim 8, wherein the first vibration part further comprises a glue recess provided adjacent to the first magnetic element.

11. The vibration module as claimed in claim 10, wherein a surface of the first magnetic element facing the other first coil protrudes from the glue recess.

12. A vibration module, having a main axis passing through a center of the vibration module, comprising:
a fixed part; and
a first vibration part, disposed within the fixed part, comprising:
a first moving member; and
a first driving assembly driving the first moving member to move relative to the fixed part,
wherein the first moving member has a plate-like structure, the first moving member comprises a first moving member body and a first moving member connecting portion, the first moving member connecting portion protrudes from the first moving member body, and the first vibration part further comprises a first elastic element, the first elastic element comprises a first bent section, and the first bent section is fixedly connected to the first moving member connecting portion.

13. The vibration module as claimed in claim 12, wherein a surface of the first bent section is flush with a surface of the first moving member connecting portion, and the surface of the first bent section is not parallel to the main axis.

14. The vibration module as claimed in claim 12, wherein the first elastic element comprises a plurality of springs, the springs are respectively located at opposite sides of the first moving member, and the springs are respectively disposed in the opposite directions.

15. The vibration module as claimed in claim 14, wherein each of the springs respectively comprise a recessed structure, and openings of the recessed structures face different directions.

16. The vibration module as claimed in claim 14, wherein each of the springs comprises a first segment, a second segment and a bent portion, the first segment is connected to the second segment through the bent portion, the first segment comprises a first straight section, a first bent section and a first folded section extending at different angles, the first bent section at least partially overlaps the first folded section when viewed along a direction perpendicular to the main axis.

17. The vibration module as claimed in claim 16, wherein the second segment comprises a second straight section, a second bent section and a second folded section extending at different angles, the first bent section at least partially overlaps the second bent section when viewed along the direction perpendicular to the main axis.

18. A vibration module, having a main axis passing through a center of the vibration module, comprising:
a fixed part; and
a first vibration part, disposed within the fixed part, comprising:
a first moving member; and
a first driving assembly driving the first moving member to move relative to the fixed part,
wherein the first vibration part further comprises a position sensing assembly to sense the movement of the first moving member relative to the fixed part, the first driving assembly comprises a first coil and a first magnetic element, a non-zero distance is provided between a center of the position sensing assembly and a winding axis of the first coil.

19. A vibration module, having a main axis passing through a center of the vibration module, comprising:
a fixed part; and
a first vibration part, disposed within the fixed part, comprising:
a first moving member; and
a first driving assembly driving the first moving member to move relative to the fixed part,
wherein the first vibration part further comprises:
a first circuit assembly, electrically connected to the first driving assembly; and
a supporting element, disposed between the first driving assembly and the fixed part, wherein the first circuit assembly at least partially overlaps the supporting element when viewed in a direction perpendicular to the main axis.

* * * * *